US008492698B2

(12) United States Patent
Schofield et al.

(10) Patent No.: US 8,492,698 B2
(45) Date of Patent: Jul. 23, 2013

(54) DRIVER ASSISTANCE SYSTEM FOR A VEHICLE

(71) Applicant: Donnelly Corporation, Holland, MI (US)

(72) Inventors: Kenneth Schofield, Holland, MI (US); Mark L. Larson, Grand Haven, MI (US); Keith J. Vadas, Coopersville, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/749,839

(22) Filed: Jan. 25, 2013

(65) Prior Publication Data

US 2013/0138294 A1    May 30, 2013

Related U.S. Application Data

(63) Continuation of application No. 13/689,798, filed on Nov. 30, 2012, which is a continuation of application No. 13/550,064, filed on Jul. 16, 2012, now Pat. No. 8,324,552, which is a continuation of application No. 13/204,106, filed on Aug. 5, 2011, now Pat. No. 8,222,588, which is a continuation of application No. 12/640,425, filed on Dec. 17, 2009, now Pat. No. 7,994,462, which is a continuation of application No. 12/273,879, filed on Nov. 19, 2008, now Pat. No. 7,655,894, which is a continuation of application No. 11/626,535, filed on Jan. 24, 2007, now Pat. No. 7,459,664, which is a continuation of application No. 11/545,039, filed on Oct. 6, 2006, now Pat. No. 7,402,786, which is a continuation of application No. 09/441,341, filed on Nov. 16, 1999, now Pat. No. 7,339,149, which is a continuation of application No. 09/135,565, filed on Aug. 17, 1998, now Pat. No. 6,097,023, which is a continuation of application No. 08/621,863, filed on Mar. 25, 1996, now Pat. No. 5,796,094.

(51) Int. Cl.
*B60Q 1/02*    (2006.01)

(52) U.S. Cl.
USPC ........................................ 250/208.1; 382/104

(58) Field of Classification Search
USPC .................... 250/208.1; 382/104; 701/23–28, 701/200, 224; 702/92; 340/901; 348/118
See application file for complete search history.

(56) References Cited

U.S. PATENT DOCUMENTS 2,632,040 A    3/1953    Rabinow
2,827,594 A    3/1958    Rabinow
(Continued)

FOREIGN PATENT DOCUMENTS

DE    2133182    1/1973
DE    2808260    8/1979
(Continued)

OTHER PUBLICATIONS

Decision—Motions—Bd. R. 125(a), issued Aug. 29, 2006 in connection with Interference No. 105,325, which involved U.S. Appl. No. 09/441,341, filed Nov. 16, 1999 by Schofield et al. and U.S. Patent No. 5,837,994, issued to Stam et al.

(Continued)

*Primary Examiner* — Seung C Sohn
(74) *Attorney, Agent, or Firm* — Gardner, Linn, Burkhart & Flory, LLP

(57) ABSTRACT

A driver assistance system for a vehicle includes a bracket attached at a windshield of a vehicle and a housing mounted to the bracket and an imager disposed in the housing. The imager may include (i) a two-dimensional CMOS photosensor array of photosensor elements and/or (ii) a lens. With the housing mounted to the bracket attached at the vehicle windshield, the imager views to the exterior of the vehicle through the vehicle windshield at a region of the windshield that may be swept by a windshield wiper of the vehicle. The photosensor array is operable to capture image data. A control includes an image processor disposed in the housing. The image processor includes a digital signal processor. The driver assistance system identifies objects viewed by the imager via processing by the image processor of captured image data. A spectral filter may be disposed between the photosensor array and the lens.

107 Claims, 11 Drawing Sheets

U.S. PATENT DOCUMENTS

| | | |
|---|---|---|
| 3,141,393 A | 7/1964 | Platt |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,647,161 A | 3/1987 | Müller |
| 4,653,316 A | 3/1987 | Fukuhara |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,713,685 A | 12/1987 | Nishimura et al. |
| 4,727,290 A | 2/1988 | Smith et al. |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,956,591 A | 9/1990 | Schierbeek |
| 4,961,625 A | 10/1990 | Wood et al. |
| 4,967,319 A | 10/1990 | Seko |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,121,200 A | 6/1992 | Choi |
| 5,124,549 A | 6/1992 | Michaels et al. |
| 5,148,014 A | 9/1992 | Lynam |
| 5,168,378 A | 12/1992 | Black |
| 5,170,374 A | 12/1992 | Shimohigashi et al. |
| 5,172,235 A | 12/1992 | Wilm et al. |
| 5,182,502 A | 1/1993 | Slotkowski et al. |
| 5,184,956 A | 2/1993 | Langlais et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,406,395 A | 4/1995 | Wilson et al. |
| 5,410,346 A | 4/1995 | Saneyoshi et al. |
| 5,414,257 A | 5/1995 | Stanton |
| 5,414,461 A | 5/1995 | Kishi et al. |
| 5,416,318 A | 5/1995 | Hegyi |
| 5,424,952 A | 6/1995 | Asayama |
| 5,426,294 A | 6/1995 | Kobayashi et al. |
| 5,430,431 A | 7/1995 | Nelson |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,487,116 A | 1/1996 | Nakano et al. |

| | | |
|---|---|---|
| 5,498,866 A | 3/1996 | Bendicks et al. |
| 5,510,983 A | 4/1996 | Iino |
| 5,515,448 A | 5/1996 | Nishitani |
| 5,528,698 A | 6/1996 | Kamei et al. |
| 5,529,138 A | 6/1996 | Shaw et al. |
| 5,530,420 A | 6/1996 | Tsuchiya et al. |
| 5,530,771 A | 6/1996 | Maekawa |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,312 A | 9/1996 | Shima et al. |
| 5,555,555 A | 9/1996 | Sato et al. |
| 5,568,027 A | 10/1996 | Teder |
| 5,574,443 A | 11/1996 | Hsieh |
| 5,614,788 A | 3/1997 | Mullins |
| 5,627,586 A | 5/1997 | Yamasaki |
| 5,634,709 A | 6/1997 | Iwama |
| 5,638,116 A | 6/1997 | Shimoura et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,670,935 A | 9/1997 | Schofield et al. |
| 5,675,489 A | 10/1997 | Pomerleau |
| 5,757,949 A | 5/1998 | Kinoshita et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,765,116 A | 6/1998 | Wilson-Jones et al. |
| 5,781,437 A | 7/1998 | Wiemer et al. |
| 5,790,403 A | 8/1998 | Nakayama |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,837,994 A | 11/1998 | Stam et al. |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,897 A | 3/1999 | Schofield et al. |
| 5,883,739 A | 3/1999 | Ashihara et al. |
| 5,890,021 A | 3/1999 | Onoda |
| 5,896,085 A | 4/1999 | Mori et al. |
| 5,923,027 A | 7/1999 | Stam et al. |
| 5,949,331 A | 9/1999 | Schofield et al. |
| 5,959,555 A | 9/1999 | Furuta |
| 5,963,247 A | 10/1999 | Banitt |
| 5,990,469 A | 11/1999 | Bechtel et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,124,886 A | 9/2000 | DeLine et al. |
| 6,144,022 A | 11/2000 | Tennenbaum et al. |
| 6,172,613 B1 | 1/2001 | DeLine et al. |
| 6,201,642 B1 | 3/2001 | Bos |
| 6,222,447 B1 | 4/2001 | Schofield et al. |
| 6,243,003 B1 | 6/2001 | DeLine et al. |
| 6,302,545 B1 | 10/2001 | Schofield et al. |
| 6,313,454 B1 | 11/2001 | Bos et al. |
| 6,320,176 B1 | 11/2001 | Schofield et al. |
| 6,396,397 B1 | 5/2002 | Schofield et al. |
| 6,411,328 B1 | 6/2002 | Franke et al. |
| 6,424,273 B1 | 7/2002 | Gutta et al. |
| 6,433,676 B2 | 8/2002 | DeLine et al. |
| 6,442,465 B2 | 8/2002 | Breed et al. |
| 6,498,620 B2 | 12/2002 | Schofield et al. |
| 6,523,964 B2 | 2/2003 | Schofield et al. |
| 6,534,884 B2 | 3/2003 | Marcus et al. |
| 6,553,130 B1 | 4/2003 | Lemelson et al. |
| 6,559,435 B2 | 5/2003 | Schofield et al. |
| 6,611,202 B2 | 8/2003 | Schofield et al. |
| 6,636,258 B2 | 10/2003 | Strumolo |
| 6,650,233 B2 | 11/2003 | DeLine et al. |
| 6,672,731 B2 | 1/2004 | Schnell et al. |
| 6,717,610 B1 | 4/2004 | Bos et al. |
| 6,802,617 B2 | 10/2004 | Schofield et al. |
| 6,822,563 B2 | 11/2004 | Bos et al. |
| 6,831,261 B2 | 12/2004 | Schofield et al. |
| 6,891,563 B2 | 5/2005 | Schofield et al. |
| 6,953,253 B2 | 10/2005 | Schofield et al. |
| 6,975,775 B2 | 12/2005 | Rykowski et al. |
| 7,062,300 B1 | 6/2006 | Kim |
| 7,227,459 B2 | 6/2007 | Bos et al. |
| 7,459,664 B2 | 12/2008 | Schofield et al. |
| 7,994,462 B2 | 8/2011 | Schofield et al. |
| 8,222,588 B2 | 7/2012 | Schofield et al. |
| 8,324,552 B2 | 12/2012 | Schofield et al. |
| 2002/0015153 A1 | 2/2002 | Downs |
| 2002/0126875 A1 | 9/2002 | Naoi et al. |
| 2004/0051634 A1 | 3/2004 | Schofield et al. |
| 2004/0114381 A1 | 6/2004 | Salmeen et al. |
| 2004/0200948 A1 | 10/2004 | Bos et al. |
| 2005/0146792 A1 | 7/2005 | Schofield et al. |
| 2005/0200700 A1 | 9/2005 | Schofield et al. |
| 2005/0219852 A1 | 10/2005 | Stam et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0091813 A1 | 5/2006 | Stam et al. |
| 2007/0023613 A1 | 2/2007 | Schofield et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1 | 5/2007 | Schofield et al. |
| 2007/0120657 A1 | 5/2007 | Schofield et al. |
| 2007/0176080 A1 | 8/2007 | Schofield et al. |

FOREIGN PATENT DOCUMENTS

| | | |
|---|---|---|
| DE | 2931368 | 2/1981 |
| DE | 2946561 | 5/1981 |
| DE | 3041692 | 5/1981 |
| DE | 3248511 | 7/1984 |
| DE | 3041612 | 8/1986 |
| DE | 4107965 | 9/1991 |
| DE | 4118208 | 11/1991 |
| DE | 4139515 | 6/1992 |
| DE | 4123641 | 1/1993 |
| EP | 48506 | 3/1982 |
| EP | 48810 | 9/1985 |
| EP | 0202460 | 11/1986 |
| EP | 0416222 | 3/1991 |
| EP | 0426503 | 5/1991 |
| EP | 0450553 | 10/1991 |
| EP | 0492591 | 7/1992 |
| EP | 0513476 | 11/1992 |
| EP | 0788947 | 8/1997 |
| EP | 0830267 | 12/2001 |
| FR | 2241085 | 3/1973 |
| FR | 2513198 | 3/1983 |
| FR | 2585991 | 2/1987 |
| FR | 2641237 | 7/1990 |
| FR | 2672857 | 8/1992 |
| FR | 2673499 | 9/1992 |
| FR | 2726144 | 4/1996 |
| GB | 934037 | 8/1963 |
| GB | 1535182 | 12/1978 |
| GB | 2029343 | 3/1980 |
| GB | 2119087 | 11/1983 |
| GB | 2137373 | 10/1984 |
| GB | 2137573 | 10/1984 |
| GB | 2156295 | 10/1985 |
| GB | 2244187 | 11/1991 |
| GB | 2255539 | 11/1992 |
| GB | 2327823 | 2/1999 |
| JP | 55039843 | 3/1980 |
| JP | 5630305 | 3/1981 |
| JP | 57173801 | 10/1982 |

| | | |
|---|---|---|
| JP | 57208530 | 12/1982 |
| JP | 58110334 | 6/1983 |
| JP | 58209635 | 12/1983 |
| JP | 5951301 | 3/1984 |
| JP | 5951325 | 3/1984 |
| JP | 59114139 | 7/1984 |
| JP | 59133336 | 9/1984 |
| JP | 6080953 | 5/1985 |
| JP | 0212730 | 10/1985 |
| JP | 60166651 | 11/1985 |
| JP | 60261275 | 12/1985 |
| JP | 6154942 | 3/1986 |
| JP | 6156638 | 7/1986 |
| JP | 6243543 | 2/1987 |
| JP | 62122487 | 6/1987 |
| JP | 62122844 | 6/1987 |
| JP | 62131837 | 6/1987 |
| JP | 6414700 | 1/1989 |
| JP | 01123587 | 5/1989 |
| JP | 30061192 | 3/1991 |
| JP | 03099952 | 4/1991 |
| JP | 042394 | 11/1991 |
| JP | 3284413 | 12/1991 |
| JP | 417386 | 1/1992 |
| JP | 4114587 | 4/1992 |
| JP | 40245886 | 9/1992 |
| JP | 57208531 | 12/1992 |
| JP | 50000638 | 1/1993 |
| JP | 0550883 | 3/1993 |
| JP | 0577657 | 3/1993 |
| JP | 5819941 | 5/1993 |
| JP | 5213113 | 8/1993 |
| JP | 6107035 | 4/1994 |
| JP | 6227318 | 8/1994 |
| JP | 06267304 | 9/1994 |
| JP | 06276524 | 9/1994 |
| JP | 06295601 | 10/1994 |
| JP | 074170 | 1/1995 |
| JP | 732936 | 2/1995 |
| JP | 747878 | 2/1995 |
| JP | 7052706 | 2/1995 |
| JP | 769125 | 3/1995 |
| JP | 07105496 | 4/1995 |
| JP | 08166221 | 6/1996 |
| JP | 2630604 | 4/1997 |
| WO | WO-8605147 | 9/1986 |
| WO | WO-9419212 | 9/1994 |
| WO | WO-9427262 | 11/1994 |
| WO | WO-9621581 | 7/1996 |
| WO | WO-9638319 | 12/1996 |
| WO | WO-9735743 | 10/1997 |
| WO | WO-9814974 | 4/1998 |
| WO | WO-9914088 | 3/1999 |
| WO | WO-9923828 | 5/1999 |

OTHER PUBLICATIONS

Reexamination Control No. 90/007,519, dated Jun. 9, 2005, Reexamination of U.S. Patent No. 6,222,447, issued to Schofield et al.
Reexamination Control No. 90/007,520, dated Jun. 9, 2005, Reexamination of U.S. Patent No. 5,949,331, issued to Schofield et al.
Reexamination Control No. 90/011,478, dated Mar. 28, 2011, Reexamination of U.S. Patent No. 6,222,447, issued to Schofield et al.
Reexamination Control No. 90/011,477, dated Mar. 14, 2011, Reexamination of U.S. Patent No. 5,949,331, issued to Schofield et al.
Search Report from European Patent Application No. EP 96 91 6533.
Wang, G., et al. "CMOS Video Cameras", IEEE, 1991, p. 100-103.
Ballard, Dana H. et al., "Computer Vision", 1982, p. 88-89, sect. 3.4.1.
Article entitled "Generation of Vision Technology," published by VLSI Vision Limited, publication date unknown.
Article entitled "On-Chip CMOS Sensors for VLSI Imaging Systems," published by VLSI Vision Limited, 1991.
Johannes, Laura "A New Microchip Ushers in Cheaper Digital Cameras", *The Wall Street Journal*, Aug. 21, 1998, p. B1.
Hamit, Francis "360-Degree Interactivity: New Video and Still Cameras Provide a Global Roaming Viewpoint", *Advanced Imaging*, Mar. 1997, p. 50.
Kobe, Gerry, "Hypnotic Wizardry! (interior electronics)," *Automotive Industries*, vol. 169, No. 5, p. 60, published May 1989. Relevant section is entitled Instrumentation.
SAE Information Report, "Vision Factors Considerations in Rear View Mirror Design—SAE J985 OCT88," approved Oct. 1988, and located in 1995 SAE Handbook, vol. 3.

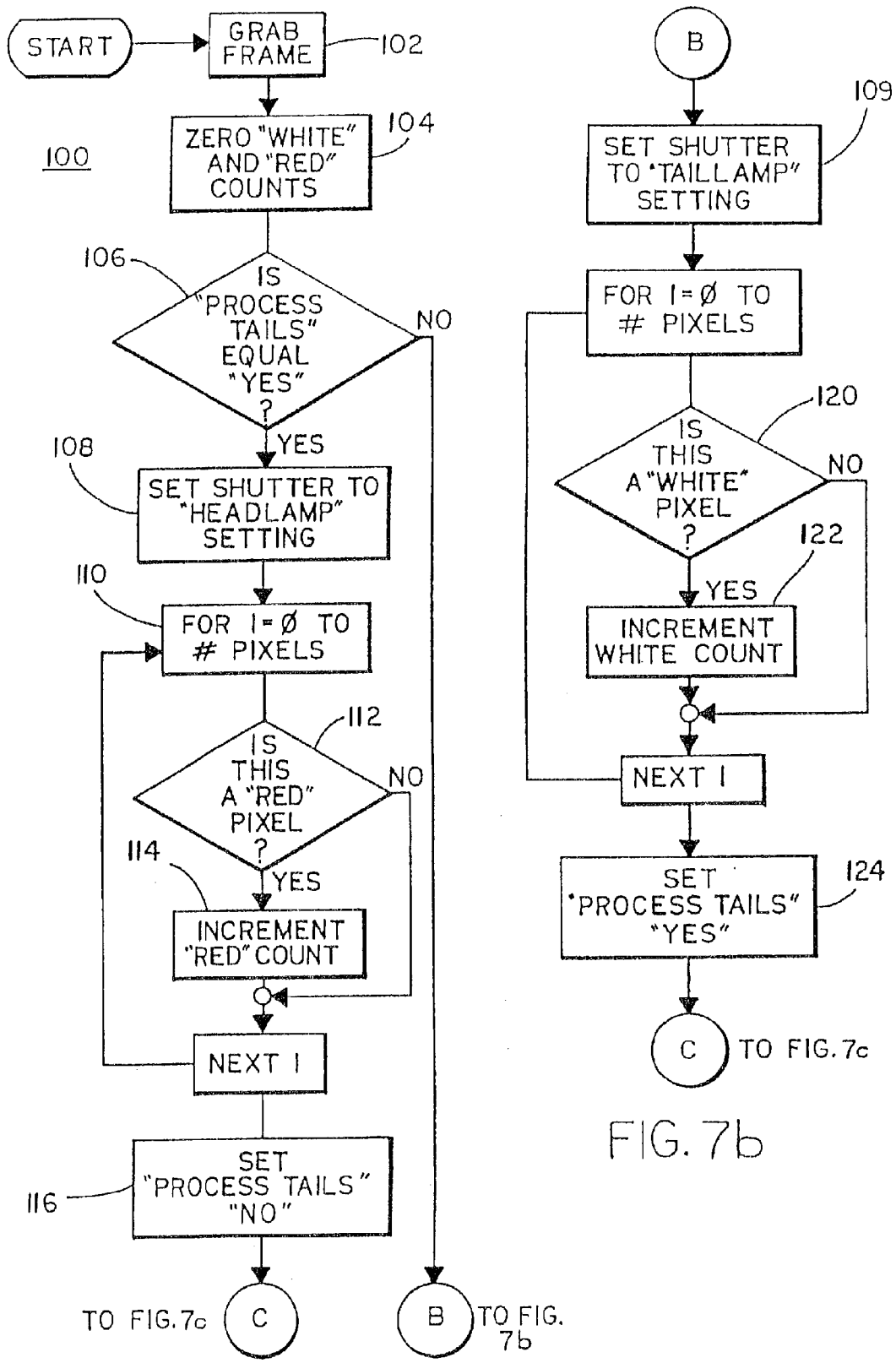

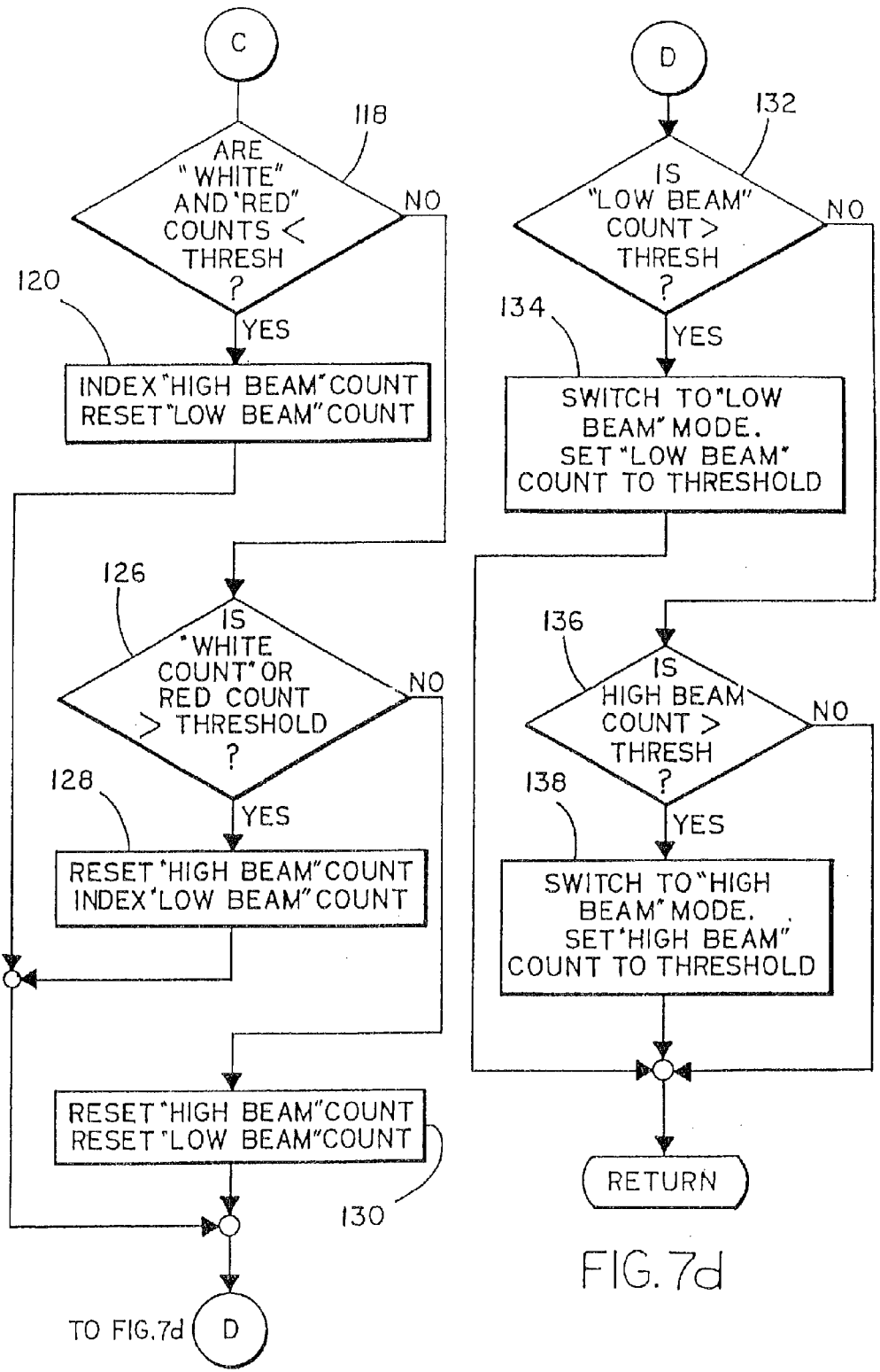

NORMAL (DRY) CONDITIONS:

FOGGY CONDITIONS:

DRIVER ASSISTANCE SYSTEM FOR A VEHICLE

CROSS-REFERENCE TO RELATED APPLICATIONS

This application is a continuation of U.S. patent application Ser. No. 13/689,798, filed Nov. 30, 2012, which is a continuation of U.S. patent application Ser. No. 13/550,064, filed Jul. 16, 2012, now U.S. Pat. No. 8,324,552, which is a continuation of U.S. patent application Ser. No. 13/204,106, filed Aug. 5, 2011, now U.S. Pat. No. 8,222,588, which is a continuation of U.S. patent application Ser. No. 12/640,425, filed Dec. 17, 2009, now U.S. Pat. No. 7,994,462, which is a continuation of U.S. patent application Ser. No. 12/273,879, filed Nov. 19, 2008, now U.S. Pat. No. 7,655,894, which is a continuation of U.S. patent application Ser. No. 11/626,535, filed Jan. 24, 2007, now U.S. Pat. No. 7,459,664, which is a continuation of U.S. patent application Ser. No. 11/545,039, filed Oct. 6, 2006, now U.S. Pat. No. 7,402,786, which is a continuation of U.S. patent application Ser. No. 09/441,341, filed Nov. 16, 1999, now U.S. Pat. No. 7,339,149, which is a continuation of U.S. patent application Ser. No. 09/135,565, filed Aug. 17, 1998, now U.S. Pat. No. 6,097,023, which is a continuation of U.S. patent application Ser. No. 08/621,863, filed Mar. 25, 1996, now U.S. Pat. No. 5,796,094.

BACKGROUND OF THE INVENTION

This invention relates generally to vehicle control systems and, in particular, to a system and method for controlling the headlights of the vehicles. The invention is particularly adapted to controlling the vehicle's headlamps in response to sensing the headlights of oncoming vehicles and taillights of leading vehicles.

It has long been a goal to automatically control the state of a vehicle's headlights in order to accomplish automatically that which is manually performed by the driver. In particular, the driver of a vehicle whose headlights are in a high-beam state will dim the headlights upon conscious realization that the headlights are a distraction to the driver of an oncoming vehicle or a leading vehicle. It is desirable to relieve the driver of such duties and thereby allow the driver to concentrate on the driving task at hand. The ideal automatic control would also facilitate the use of high beams in conditions which allow their use, increasing the safety for the controlled vehicle as well as reducing the hazard caused by the occasional failure of the driver to dim the headlights when such headlights are distracting another driver.

Prior attempts at vehicle headlight dimming controls have included a single light sensor which integrates light in the scene forward of the vehicle. When the integrated light exceeds a threshold, the vehicle headlights are dimmed. Such approaches have been ineffective. The headlights of oncoming vehicles are, at least from a distance, point sources of light. In order to detect such light sources in an integrated scene, it is necessary to set a sufficiently low threshold of detection that many non-point-sources at lower intensities are interpreted as headlights or taillights. Such prior art vehicle headlight dimming controls have also been ineffective at reliably detecting the taillights of leading vehicles. The apparent reason is that the characteristics of these two light sources; for example, intensity, are so different that detecting both has been impractical. In order to overcome such deficiencies, additional solutions have been attempted, such as the use of infrared filtering, baffling of the optic sensor, and the like. While such modifications may have improved performance somewhat, the long-felt need for a commercially useful vehicle headlight dimming control has gone unmet.

SUMMARY OF THE INVENTION

The present invention provides a vehicle control which is capable of identifying unique characteristics of light sources based upon a precise evaluation of light source characteristics made in each portion of the scene forward of the vehicle, in the vicinity of each light source, by separating each light source from the remainder of the scene and analyzing that source to determine its characteristics. One characteristic used in identifying a light source is the spectral characteristics of that source which is compared with spectral signatures of known light sources, such as those of headlights and taillights. Another characteristic used in identifying a light source is the spatial layout of the light source. By providing the ability to identify the headlights of oncoming vehicles and the taillights of leading vehicles, the state of the headlights of the controlled vehicle may be adjusted in response to the presence or absence of either of these light sources or the intensity of these light sources.

This is accomplished according to an aspect of the invention by providing an imaging sensor which divides the scene forward of the vehicle into a plurality of spatially separated sensing regions. A control circuit is provided that is responsive to the photosensors in order to determine if individual regions include light levels having a particular intensity. The control circuit thereby identifies particular light sources and provides a control output to the vehicle that is a function of the light source identified. The control output may control the dimmed state of the vehicle's headlamps.

In order to more robustly respond to the different characteristics of headlights and taillights, a different exposure period is provided for the array in order to detect each light source. In particular, the exposure period may be longer for detecting leading taillights and significantly shorter for detecting oncoming headlights.

According to another aspect of the invention, a solid-state light imaging array is provided that is made up of a plurality of sensors arranged in a matrix on at least one semiconductor substrate. The light-imaging array includes at least one spectral separation device, wherein each of the sensors responds to light in a particular spectral region. The control circuit responds to the plurality of sensors in order to determine if spatially adjacent regions of the field of view forward of the vehicle include light of a particular spectral signature above a particular intensity level. In this manner, the control identifies light sources that are either oncoming headlights or leading taillights by identifying such light sources according to their spectral makeup.

According to another aspect of the invention, a solid-state light-imaging array is provided that is made up of a plurality of sensors that divide the scene forward of the vehicle into spatially separated regions, and light sources are identified, at least in part, according to their spatial distribution across the regions. This aspect of the invention is based upon a recognition that headlights of oncoming vehicles and taillights of leading vehicles are of interest to the control, irrespective of separation distance from the controlled vehicle, if the source is on the central axis of travel of the vehicle. Oncoming headlights and leading taillights may also be of interest away from this axis, or off axis, but only if the source has a higher intensity level and is spatially larger. These characteristics of headlights and taillights of interest may be taken into consideration by increasing the resolution of the imaging array along this central axis or by increasing the detection threshold off axis, or both. Such spatial evaluation may be implemented by selecting characteristics of an optical device provided with the imaging sensor, such as providing increased magnification central of the forward scene, or providing a wide horizontal view and narrow vertical view, or the like, or by arrangement of the sensing circuitry, or a combination of these.

The present invention provides a vehicle headlight control which is exceptionally discriminating in identifying oncoming headlights and leading taillights in a commercially viable system which ignores other sources of light including streetlights and reflections of the controlled vehicle's headlights off signs, road markers, and the like. The present invention further provides a sensor having the ability to preselect data from the scene forward of the vehicle in order to reduce the input data set to optimize subsequent data processing. The invention is especially adapted for use with, but not limited to, photoarray imaging sensors, such as CMOS and CCD arrays.

These and other objects, advantages, and features of this invention will become apparent upon review of the following specification in conjunction with the drawings.

BRIEF DESCRIPTION OF THE DRAWINGS

FIGS. 7a-7d are a flowchart of a control program;

DESCRIPTION OF THE PREFERRED EMBODIMENT

Figure 1:
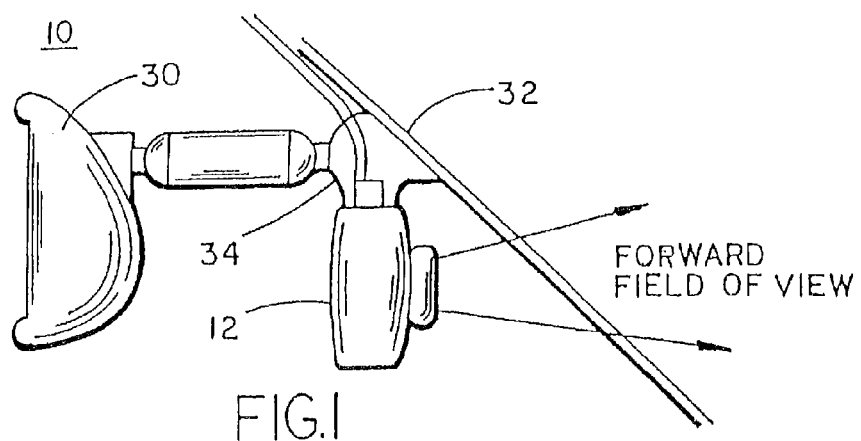
FIG. 1 is a side elevation of a portion of a vehicle embodying the invention.
Figure 2:
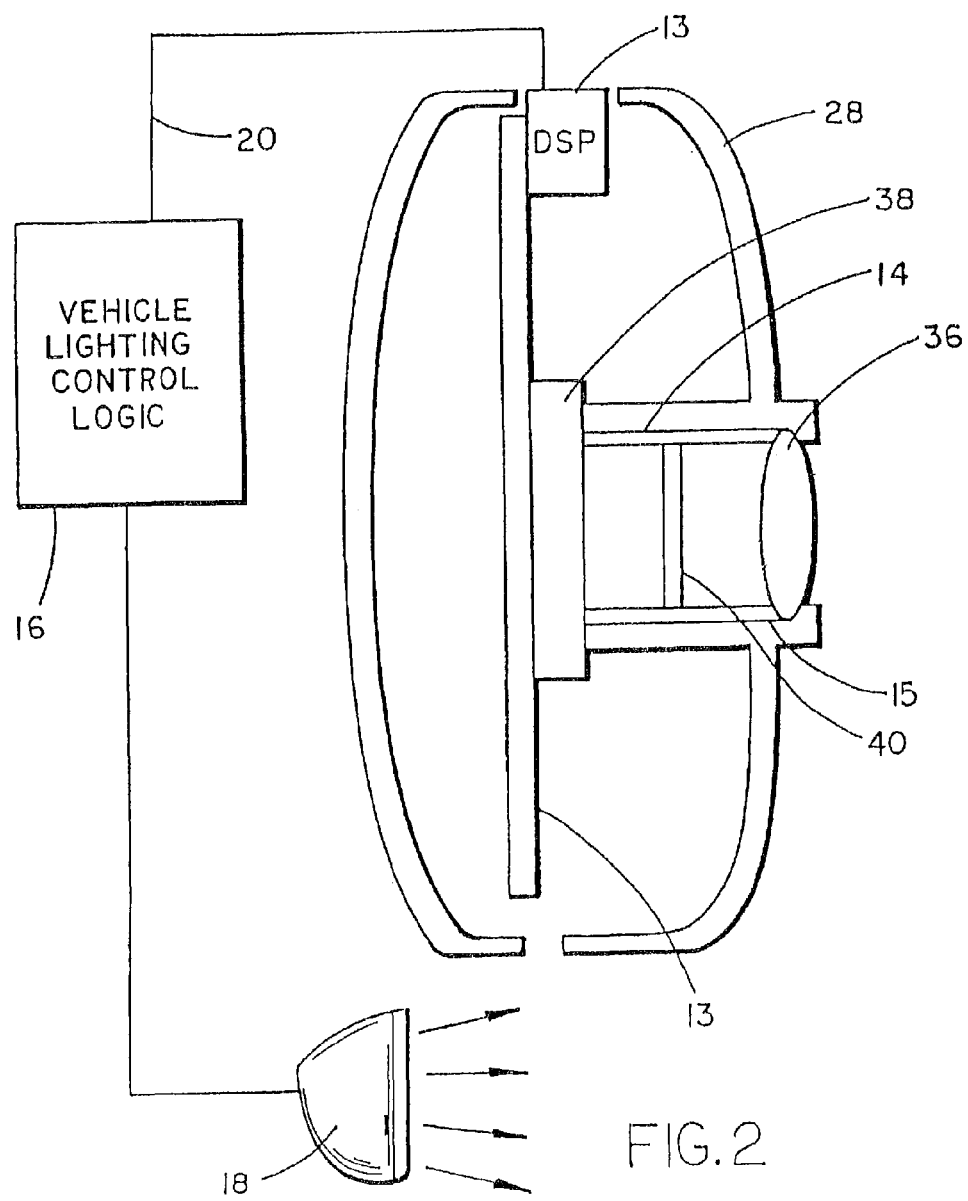
FIG. 2 is a partial side elevation view and block diagram of a vehicle headlight dimming control system according to the invention.

Referring now specifically to the drawings and the illustrative embodiments depicted therein, a vehicle 10 includes a vehicle headlight dimming control 12 made up of an imaging sensor module 14 which senses light from a scene forward of vehicle 10, an imaging control circuit 13 which receives data from sensor 14, and a vehicle lighting control logic module 16 which exchanges data with control circuit 13 and controls headlamps 18 for the purpose of modifying the headlight beam (FIGS. 1 and 2). Such control may be a binary control of the aim of the beam, such as by switching between lamps or lamp filaments, or may be a continuous variation of the aim of a single lamp more or less forward of the vehicle. The control may also control the intensity or pattern of the beam. Additionally, the lights of a vehicle equipped with daytime running lights may be switched between a daytime running light condition and a low-beam condition. Vehicle headlight dimming control 12 can perform a wide range of additional control operations on the vehicle, including turning the headlights ON and OFF, modifying the light intensity of the instrument panel, and providing an input to an electro-optic mirror system.

Figure 10:
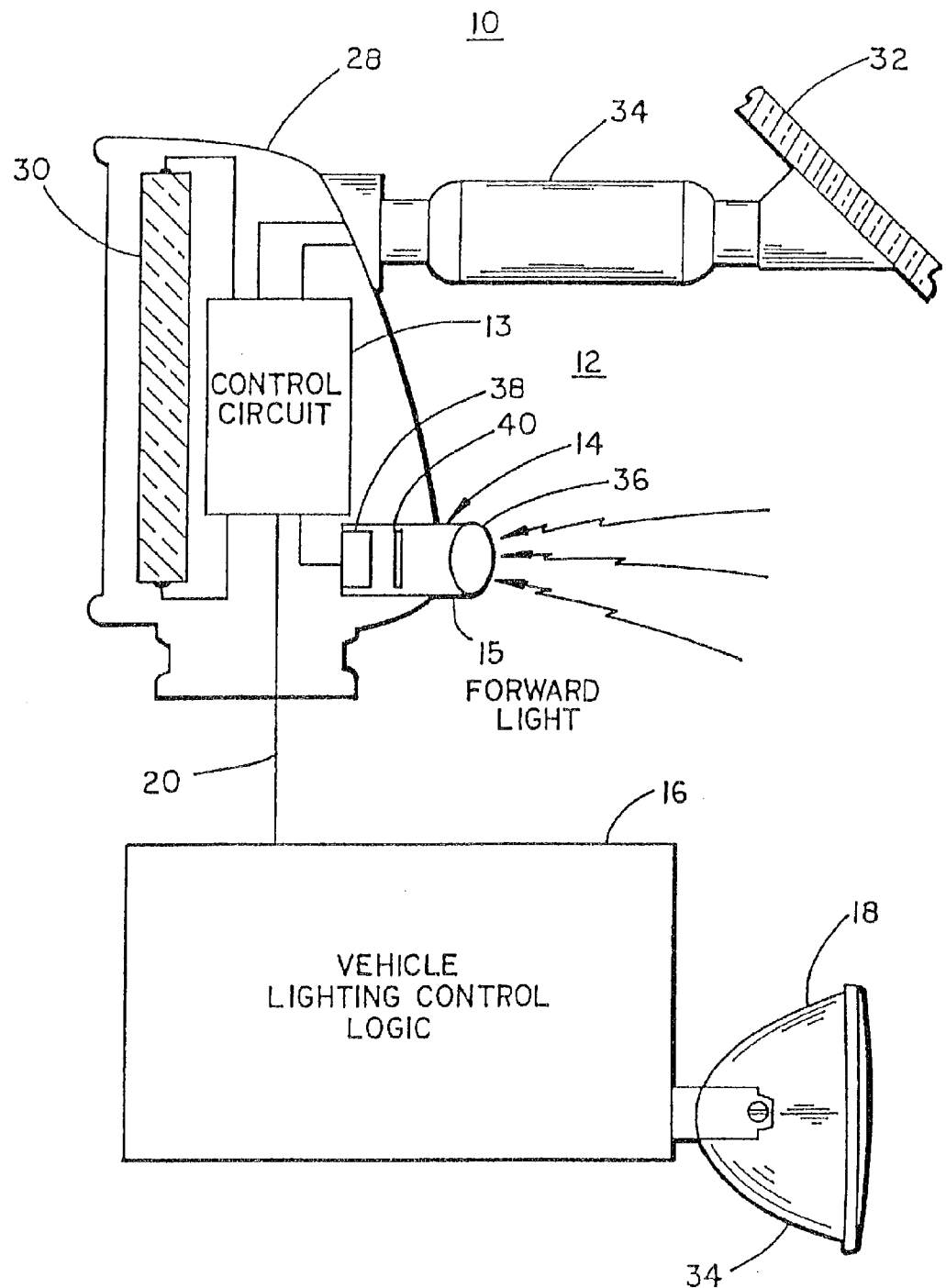
FIG. 10 is the same view as FIG. 2 of an alternative mounting arrangement.

Vehicle lighting control logic module 16 receives an input 20 from imaging control circuit 13. In particular embodiments, such as ones which adjust the state of the headlights between continuously variable states, module 16 may supply data to imaging control circuit 13, such as the speed of the vehicle, which may be combined with the data sensed by imaging sensor 14 in establishing the state of headlights 18. In the illustrated embodiment, imaging sensor module 14 may be fixedly mounted in a housing 28 by a bracket 34 mounted to, or near, the vehicle's windshield 32. Bracket 34 also mounts an interior rearview mirror 30. This is a preferred mounting for imaging sensor module 14 because the location within the interior of the vehicle substantially eliminates environmental dirt and moisture from fouling the light sensor module. Additionally, the position behind windshield 32, which typically is kept relatively clear through the use of washers and wipers and the like, ensures a relatively clear view of the scene forward of vehicle 10. Alternatively, imaging sensor module 14 may be mounted within a housing 29 of interior rearview mirror 30 facing forward with respect to vehicle 10 (FIG. 10). In such embodiment, control circuit 13 may be combined with the circuit which controls the partial reflectance level of mirror 30 if mirror 30 is an electro-optic mirror such as an electrochromic mirror. Other mounting techniques for sensor module 14 will be apparent to the skilled artisan.

Figure 3:
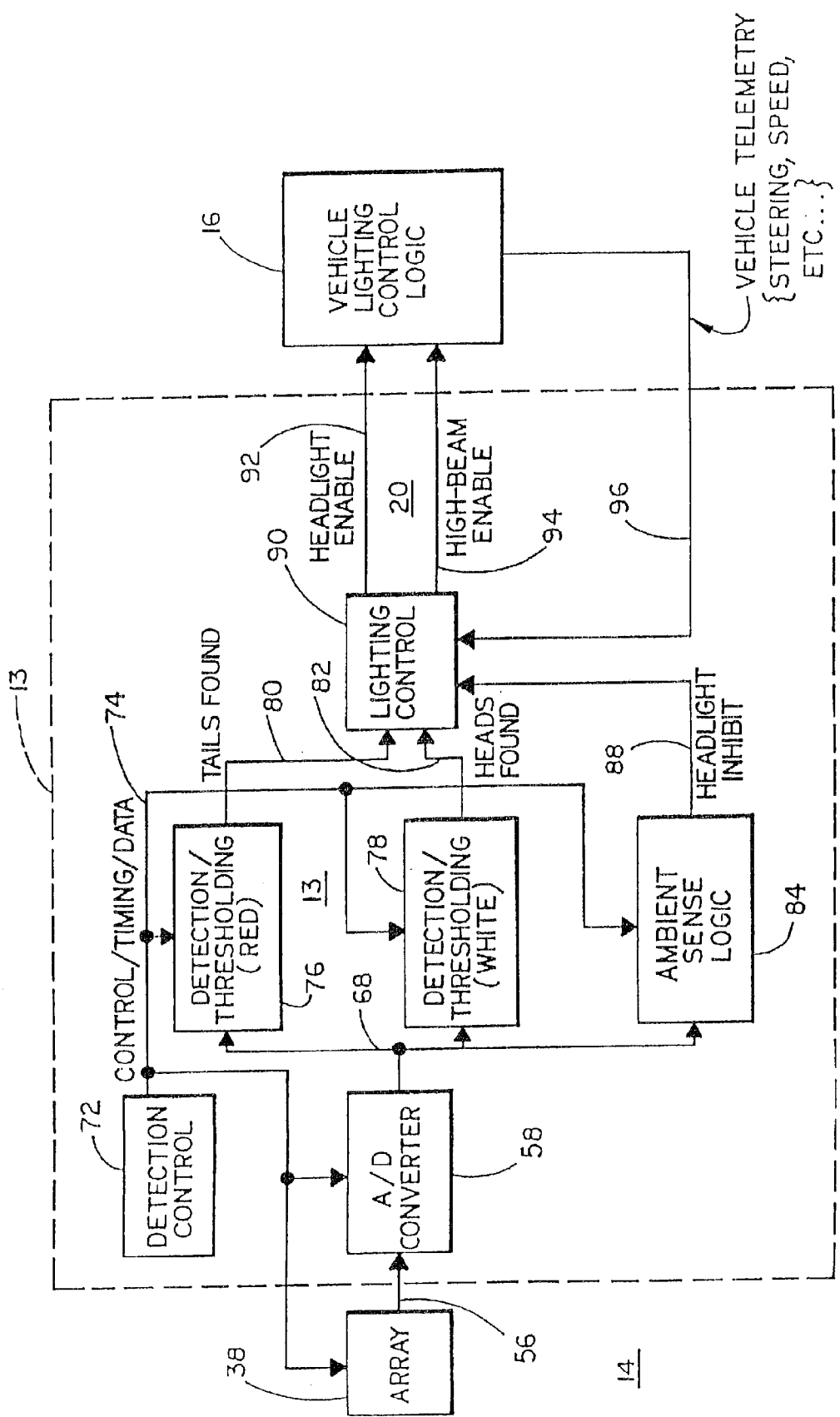
FIG. 3 is a block diagram of the control system in FIG. 2.
Figure 4:
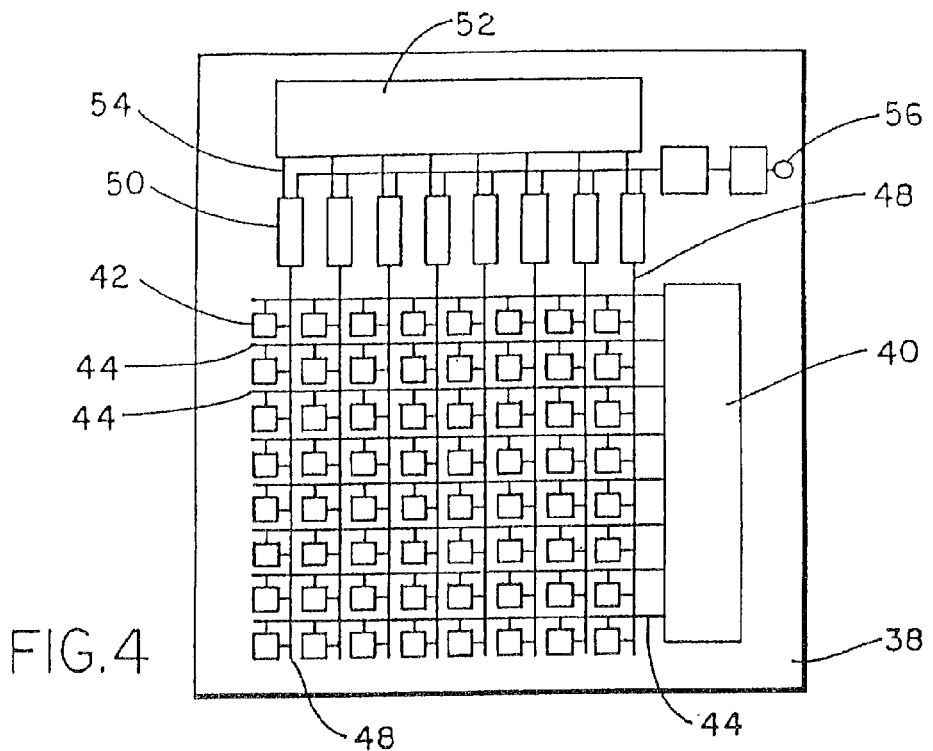
FIG. 4 is a layout of a light-sensing array useful with the invention.
Figure 5:
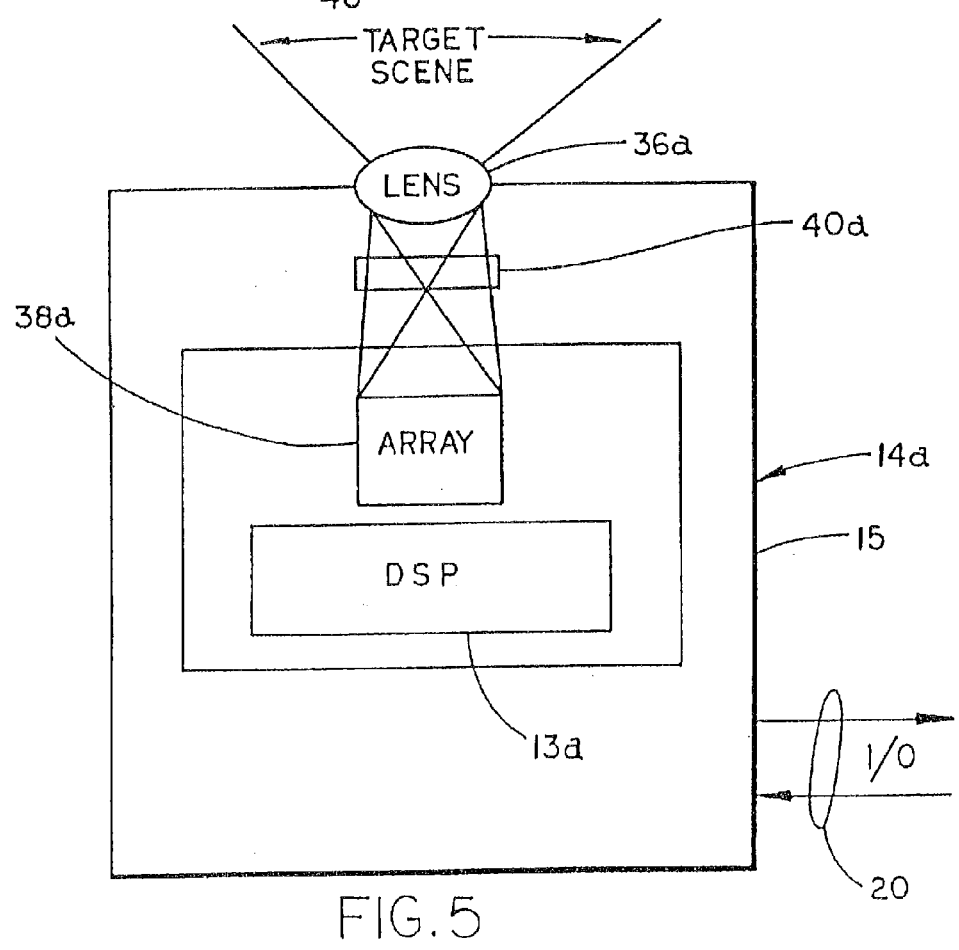
FIG. 5 is a block diagram of an imaging sensor.

Imaging sensor module 14 includes an optical device 36, such as a lens, an array 38 of photon-accumulating light sensors, and a spectral separation device for separating light from the scene forward of vehicle 10 into a plurality of spectral bands, such as a filter array 40 disposed between optical device 36 and light-sensing array 38. Light-sensing array 38 is described in detail in application Ser. No. 08/023,918, filed Feb. 26, 1993, now U.S. Pat. No. 5,550,677, the disclosure of which is hereby incorporated herein by reference. Light-sensing array 36 includes a plurality of photosensor elements 42 arranged in a matrix of columns and rows (FIG. 4). In the illustrated embodiment, an array of 512 rows and 512 columns of light-sensing pixels, each made up of a photosensor element 42 is utilized. However, a greater or lesser number of photosensor elements may be utilized and may be arranged in matrix that is laid out in other than columns and rows. Each photosensor element 42 is connected to a common word-line 44. To access the photosensor array, a vertical shift register 46 generates word-line signals to each word-line 44 to enable each row of photosensor elements 42. Each column of photosensor elements is also connected to a bit-line 48 which is connected to an amplifier 50. As each word-line 44 is accessed, a horizontal shift register 52 uses a line 54 to output the bit-line signals on consecutive bit lines 48 to an output line 56. In this manner, each photosensor element 42 may be individually accessed by appropriate manipulation of shift registers 46 and 52. Output 56 is supplied to a digital signal processor 13 which is supplied on an output 62 as input to control circuit 13 (FIGS. 3-5).

Digital signal processor 13 includes an analog-to-digital converter 58 which receives the output 56 of array 36 and converts the analog pixel values to digital values. A digital output 68 of A/D converter 58 is supplied to a taillight detection circuit 76, a headlight detection circuit 78, and to ambient sense logic circuit 84. A detection control circuit 72 supplies control and timing signals on a line 74 which is supplied to array 38, A/D converter 58 taillight detection circuit 76, headlight detection circuit 78, and ambient sense logic 84. Such signals coordinate the activities of these modules and provide any data, from look-up tables provided in control circuit 72, needed by each circuit to perform its function. For example, control circuit 72 may provide intensity threshold levels to taillight detection circuit 76 and headlight detection circuit 78.

Taillight detection circuit 76 detects a red light source having an intensity above a particular threshold as follows. For each pixel that is "red," a comparison is made with adjacent "green" pixels and "blue" pixels. If the intensity of a red pixel is more than a particular number of times the intensity of the adjacent green pixel and adjacent blue pixel, then it is determined that the light source is red. If the intensity of the "red" light source is greater than a particular threshold, an indication is provided at 80.

Headlight detection circuit 78 detects a white light source having an intensity above a particular threshold as follows. A white light is a combination of red, green, and blue components. If adjacent "red," "green," and "blue" pixels all exceed a particular threshold, a ratio comparison is made of the pixels. If the ratio of the intensity of the adjacent "red," "green," and "blue" pixels is within a particular range, such as 20 percent by way of example, then a white light source is detected.

Vehicle headlight dimming control 12 additionally includes an ambient light-sensing circuit 84 which receives an input from digital output signal 68. Ambient detection circuit 84 samples a subset of photosensor elements and detects light levels sensed by the subset over a long period of time in order to produce significant time filtration. Preferably, the photosensor elements in the sensed subset include sensors that detect portions of the forward-looking scene that are just above the earth's horizon which is more indicative of the ambient light condition. Ambient detection circuit 84 produces an indication 88 of ambient light levels which is supplied as an input to a lighting control module 90. A high ambient light level may be used by a module 90 to inhibit headlight actuation or to switch headlights 18 to a daytime running light mode. Ambient detection circuit 84 can, optionally, perform other functions, such as switching the daytime running lights of the vehicle between daytime and nighttime modes, controlling the intensity of the vehicle's instrument panel and providing an input to an electro-optic rearview mirror system.

Indications 80 and 82 from the light detection units and indication 88 from ambient detection circuit 84 are supplied to a lighting control circuit 90 which produces a first indication 92 that headlights 18 are to be switched on, or switched from a daytime running condition to a night mode, and a high-beam enable indication 94 that the headlights may be switched to a high-beam state. Vehicle lighting control logic module 16 responds to indications 92 and 94 by switching headlights 18 to an appropriate mode. An output 96 from module 16 may be provided to supply lighting control circuit 90 with information with respect to vehicle telemetry, steering, speed, and any other parameter that may be incorporated into the algorithm to determine the state of the headlights of the vehicle. Digital signal processor 13 may be implemented using discrete digital circuit modules or with a suitably programmed micro-processor with input and output buffers.

In one embodiment, an imaging sensor module 14a includes a single photosensor array 38a, one spectral filter array 40a, and one optical device 36a (FIG. 5). In this illustrated embodiment, spectral filter array 40a includes alternating spectrum filter elements for exposing adjacent pixels to different regions of the electromagnetic spectrum in the red band or green band or blue band. This may be accomplished by arranging such filter elements in stripes or by alternating filter spectral regions in a manner known in the art. Digital signal processor 13a captures a frame of data by enabling photosensor array 38a for a particular exposure period during which each photosensor element 42 accumulates photons. In order to detect oncoming headlights, digital signal processor 13a enables photosensor array 38a for a first exposure period. In order to detect leading taillights, digital signal processor 13a enables photosensor array 38a for a second exposure period. Because oncoming headlights have an intensity level that is substantially greater than that of leading taillights, the exposure period of the frame in which leading taillights is detected is at least approximately ten times the length of the exposure period during which oncoming headlights are detected. Most preferably, the exposure period for detecting leading taillights is approximately 40 times the exposure period for detecting oncoming headlights. In the illustrated embodiment, an exposure period of 0.004 seconds is utilized for detecting taillamps and 0.0001 seconds for detecting oncoming headlamps. The exposure period is the time during which each photosensor element 42 integrates photons before being read and reset by digital signal processor 13a. Establishing a different exposure period for detecting headlights verses taillights facilitates the use of existing and anticipated sensor technology by accommodating the dynamic range of such sensor technology. Exposure may also be adaptively established on a priority basis. In one such embodiment, exposure is set to a shorter headlight setting. If headlights are detected, the headlights 18 of vehicle 10 are dimmed and the exposure period is kept short. If no headlights are detected, the next frame is set to a longer exposure period. This has the advantage of shorter system cycle time as well as a reduction in sensitivity to sensor saturation and blooming. In another such embodiment, the exposure period is initially set to a long period. If an oncoming headlight is tentatively detected, the exposure period could then be switched to a short period to confirm the observation.

Vehicle headlight dimming control 12 carries out a control routine 100 (FIGS. 7a-7d). At the beginning of each pass through the routine, which occurs for every frame captured by the imaging sensor, a frame is grabbed at 102 and all of the pixels in the frame are processed as follows. Counters used for detecting white headlight sources and red taillight sources are zeroed at 104. It is then determined at 106 whether the previously processed frame was for detecting headlights or taillights. This is determined by looking at a variable "process.tails" which will be set to "yes" if the previous frame was processed to detect headlights and will be set to "no" if the previous frame was processed to detect taillights. If it is determined at 106 that the variable "process.tails" is set to "yes," the control proceeds to 108 in order to process the next frame to detect taillights. If it is determined at 106 that the variable "process.tails" is set to "no," then control passes to 109 in order to process the next frame as a headlight detecting frame.

The taillight detecting frame process begins at 108 by setting the exposure period for the imaging sensor module to grab the next frame according to a headlamp exposure level. In the illustrated embodiment, the exposure period for detecting headlights is set at 0.0001 seconds. Processing of the taillight frame proceeds at 110 by examining, for each "red" pixel, whether the intensity of light sensed by that pixel is greater than a threshold and whether the intensity of light sensed by that pixel is greater than a selected number of multiples of the intensity of light sensed by an adjacent "blue" pixel and a selected number of multiples of the intensity of light sensed by an adjacent "green" pixel. If so, then a "red"

counter is incremented at 114. Preferably, the ratio of red pixel intensity to green or blue pixel intensity is selected as a power of 2 (2, 4, 8, 16 . . . ) in order to ease digital processing. However, other ratios may be used and different ratios can be used between red/green and red/blue pixels. In the illustrated embodiment, a ratio of 4 is selected based upon ratios established from CIE illuminant charts known to skilled artisans. Based upon these charts, a ratio greater than 4 would provide greater discrimination. Such greater discrimination may not be desirable because it could result in failure to identify a leading taillight and, thereby, a failure to dim the headlights of the controlled vehicle. After all pixels have been processed, the parameter "process.tails" is set to "no" at 116 and control proceeds to 118 (FIG. 7*c*).

In a similar fashion, processing of a headlight frame begins at 110 by setting the exposure period for the imaging sensor module to grab the next frame as a red taillight detecting frame. This is accomplished by setting the exposure period of the imaging sensor module to 0.004 seconds. It is then determined at 120 for each pixel whether an adjacent set of "red," "green," and "blue" pixels each exceeds a particular threshold and whether the pixel intensity levels all fall within a particular range, such as within 20 percent of each other. If all of the red, green, and blue pixels exceed a threshold and pass the ratio test, then it is determined that a white light source is being sensed and a "white" counter is incremented at 122. After all of the pixels in the frame have been processed, the "process.tails" flag is set to a "yes" state at 124. Control then passes to 118.

It is determined at 118 whether both the "white" and the "red" counters are below respective high-beam thresholds. If so, a high-beam frame counter is incremented and a low-beam frame counter is set to zero at 120. If it is determined at 118 that both the "white" and the "red" counters are not less than a threshold, it is then determined at 126 whether either the "red" counter or the "white" counter is greater than a respective low-beam threshold. If so, the high-beam frame counter is set to zero and the low-beam frame counter is incremented at 128. If it is determined at 126 that neither the "red" counter or the "white" counter is greater than the respective low-beam threshold, then both the high-beam frame counters and the low-beam frame counters are set to zero at 130.

Control then passes to 132 where it is determined if the low-beam frame counter is greater than a particular threshold. If so, high-beam enable signal 94 is set to a "low-beam" state at 134. Additionally, the low-beam frame counter is set to the threshold level. If it is determined at 132 that the low-beam frame counter is not greater than its threshold, it is determined at 136 whether the high-beam frame counter is greater than its threshold. If so, high-beam enable signal 94 is set to "high-beam" state at 138 and the high-beam frame counter is reset to its threshold level.

Control routine 100 provides hysteresis by requiring that a headlight spectral signature or a taillight spectral signature be detected for a number of frames prior to switching the headlights to a low-beam state. Likewise, the absence of a detection of an oncoming headlight or a leading taillight must be made for multiple frames in order to switch from a low-beam to a high-beam state. This hysteresis guards against erroneous detection due to noise in a given frame and eliminates headlamp toggling when sources are at the fringe of detection range. In the illustrated embodiment, it is expected that a vehicle headlight control system 12 will respond to a change in the state of light sources in the forward field of view of the vehicle in less than 0.5 seconds. An additional level of hysteresis may be provided by forcing the headlamps to stay in a low-beam state for a given number of seconds after a transition from high beams to low beams. The reverse would not occur; namely, holding a high-beam state for a particular period to avoid annoyance to drivers of oncoming or leading vehicles.

In the illustrated embodiment, red light sources, which have the spectral signature and intensity of taillights, are detected by determining that a "red" pixel, namely a pixel which is exposed to light in the visible red band, is both greater than a given multiple of the "green" and "blue" adjacent pixels, as well as being greater than a threshold and that white light sources, which are the spectral signatures of headlights, are detected by determining that "red," "green," and "blue" pixels are both within a particular intensity range of each other as well as being greater than a threshold. This double-testing helps to reduce false detection of light sources. However, it would be possible to detect red light sources only by looking at the intensity of "red" pixels and to detect white light sources by determining that an adjacent set of "red," "blue," and "green" pixels are all above a particular threshold.

Figure 8C:
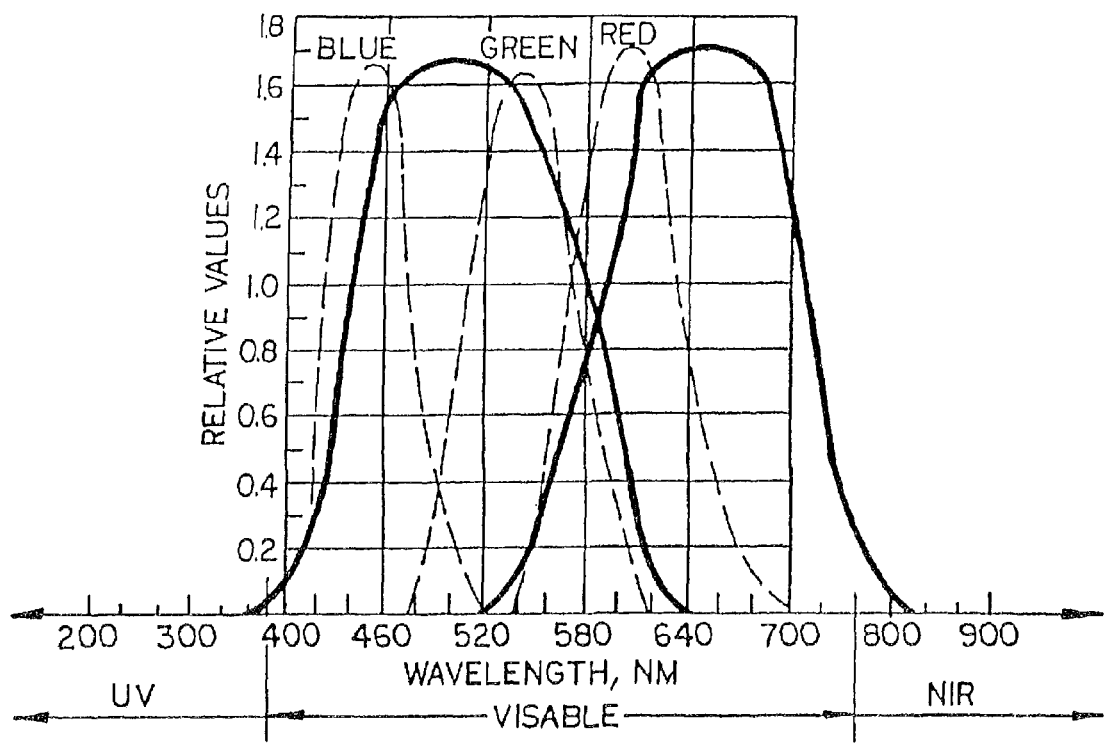
FIGS. 8a-8c are spectral charts illustrating spectra regions useful with the invention.
Figure 8A:
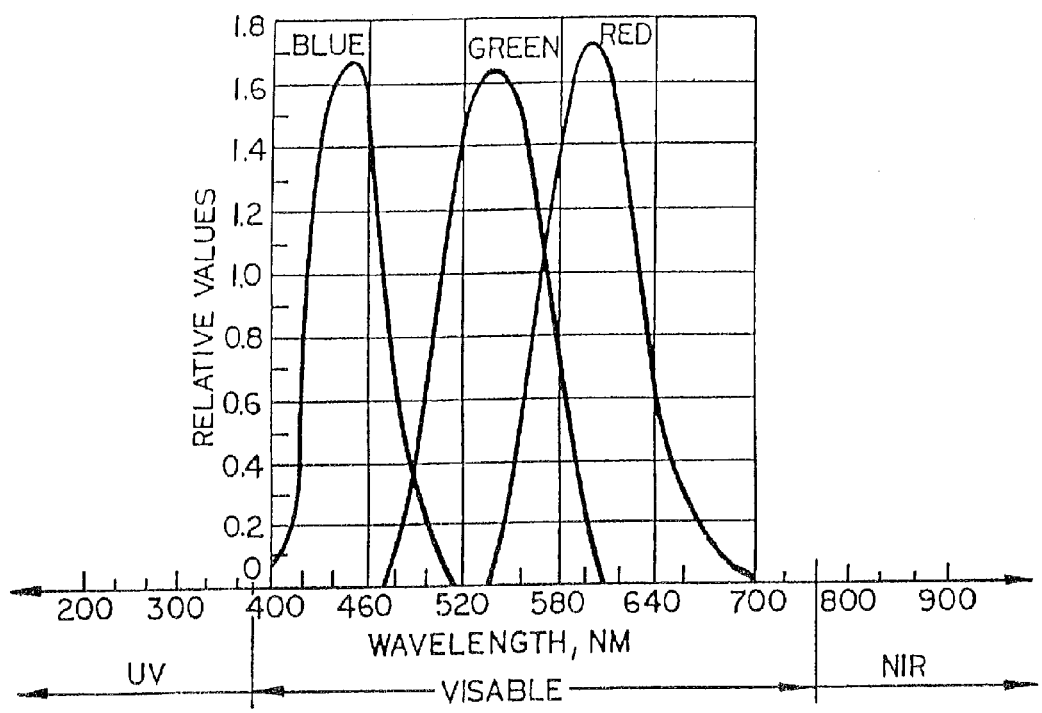
Figure 8B:
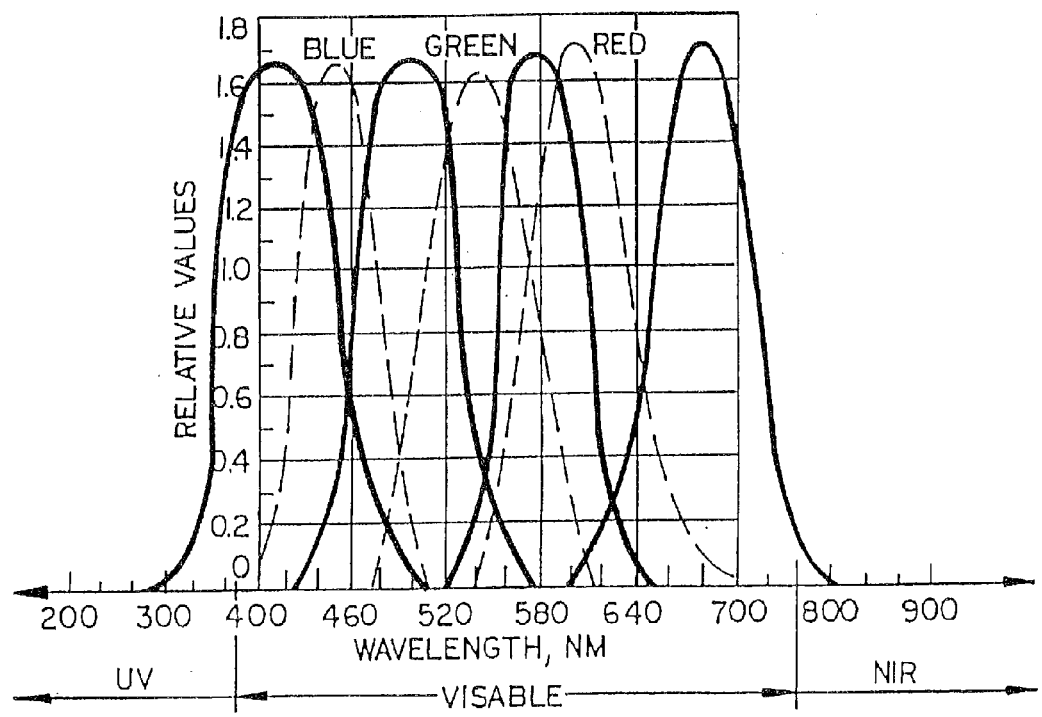

In the illustrated embodiment, spectral filtering is carried out in a manner which exposes each photosensing element in the photosensor array to a band of light falling within one of the primary ranges of the visible spectrum, namely red, green, or blue as illustrated in FIG. 8*a*. However, different bands in the frequency spectrum may be utilized including not only visible spectrum bands but invisible spectrum bands including infrared and ultraviolet bands as illustrated in FIG. 8*b*. The band selection could also be chosen from visible spectral regions that do not correspond with the primary spectrums. For example, the spectral filter may be selected in order to detect at the pixel level red light sources and the complement of red light sources as illustrated in FIG. 8*c*. These binary indications could be utilized to detect red taillights by determining that the "red" pixel is greater than a threshold and greater than a number of multiples of the intensity sensed by the "red complement" pixel adjacent thereto. Likewise, a white light source indicative of oncoming headlights could be detected by determining that both the "red" pixel and the "red complement" pixel adjacent thereto are both above a particular threshold and within a particular intensity range of each other. It may also be desirable to select bands that fall between primary spectrum regions or any other bands that may be desirable for a particular application.

Photosensing array 38 may be a charge couple device (CCD) array of the type commonly utilized in video camcorders and the like. Alternatively, photosensing array 38 could be a CMOS array of the type manufactured by VLSI Vision Ltd. (VVL) in Edinburgh, Scotland. Additionally, a hybrid of the CCD and CMOS technology may be employed. Other potentially useful photosensing technologies include CID, MOS, photo diodes, and the like.

Figure 6:
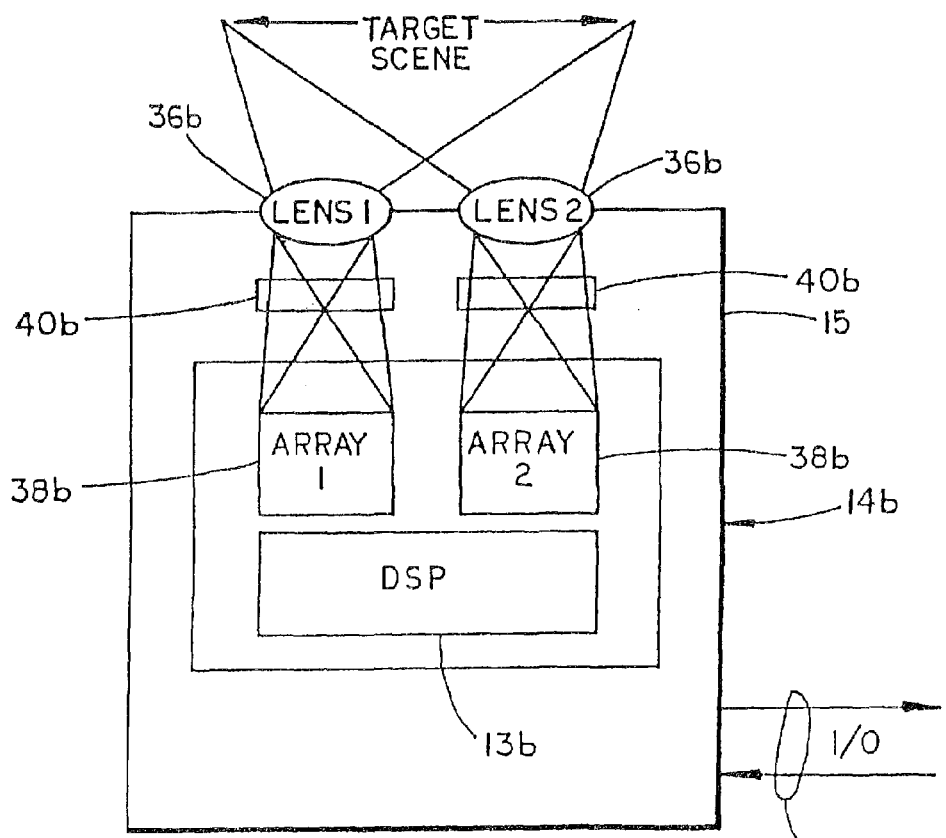
FIG. 6 is an alternative embodiment of an imaging sensor.

In an alternative embodiment, an imaging sensor module 14*b* includes two or more pairs of photosensor arrays 38*b* (FIG. 6). Each photosensor array 38*b* has an associated spectral filter array 40*b* and optical device 36*b*. In this embodiment, each array 38*b* is operated by digital signal processor 58*b* to have an exposure period that is set for detecting either oncoming headlights or leading taillights. In this manner, each frame of the scene captured by each array is utilized to detect a particular light source. This is in contrast to light-sensing module 14*a* in FIG. 5 in which each light source is detected in alternating frames. Each spectral filter 40*b* is identical, whereby each array 38*b* is capable of detecting light sources having spectrum composition including red, green, and blue regions of the spectrum. However, the spectral filters may be custom configured to the particular application. This may result in a homogeneous composition or a more complex mosaic, especially where light sources are examined in three or more spectral regions.

Figure 9:
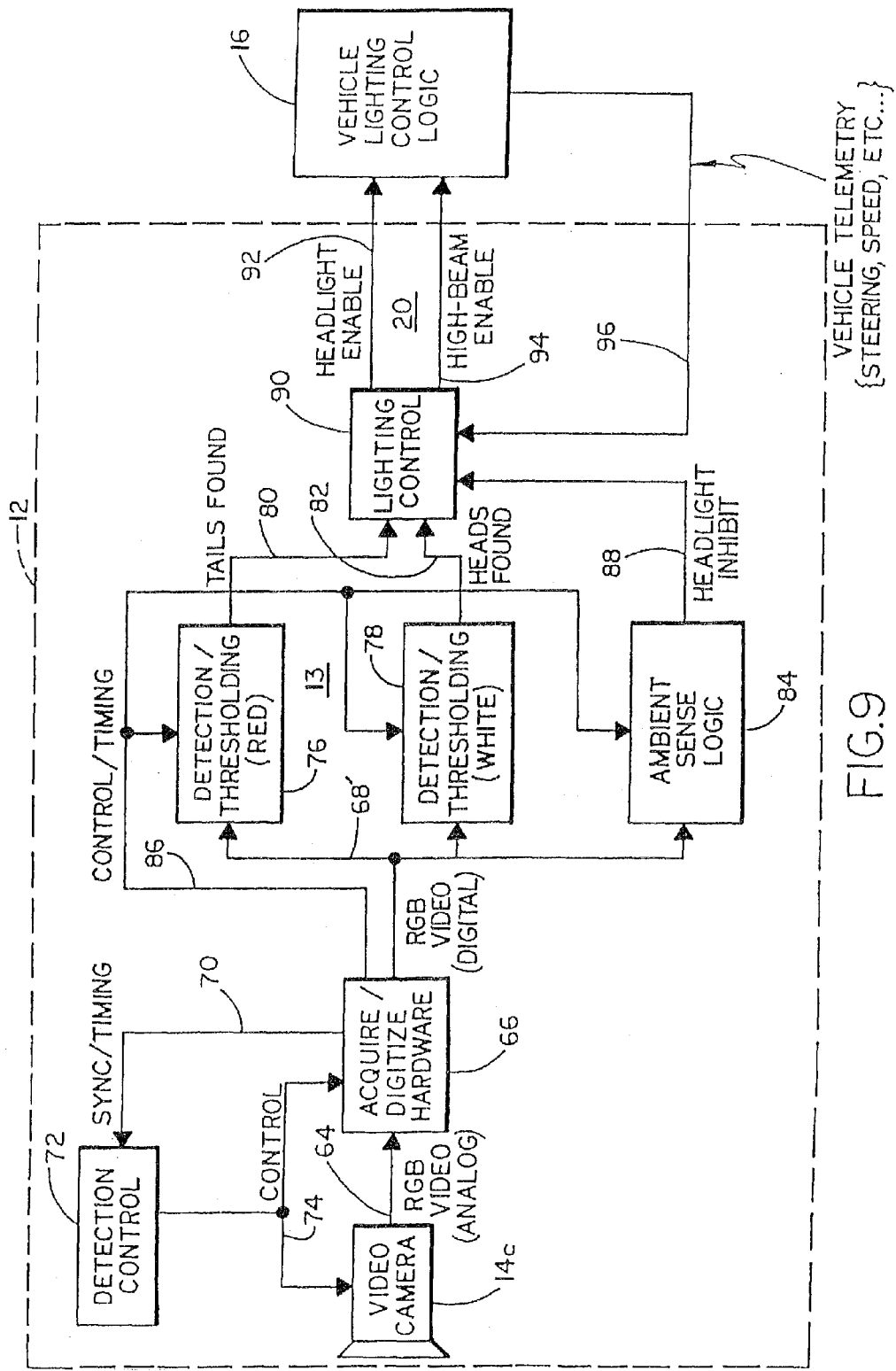
FIG. 9 is the same view as FIG. 3 of another alternative embodiment.

In yet an additional single lens system embodiment, an imaging sensor module 14c includes three light-sensing arrays (not shown) and a spectral separation device overlying the light-sensing arrays which directs spectral bands to different arrays (FIG. 9). An example of such spectral separation device is a refracting optical splitter, such as dichroic mirrors or prisms. In this manner, each light-sensing array detects light in either the red or green or blue region of the spectrum. As such, imaging sensor module 14c produces three output signals on a line 64, each representing detected light in one of the red or green or blue spectral regions. The output signals on line 64 include frame-timing signals which are decoded by digital acquisition circuits 66 which produces a digital output signal 68' indicative of intensity levels of adjacent red, green, and blue pixels. Digital acquisition circuit 66 additionally produces a timing signal output 70 which is utilized by a detection control circuit 72 in order to supply synchronizing signals, at 74, to imaging sensor module 14c and digital acquisition circuit 66. A control and timing signal 86 is produced by digital acquisition circuit 66 and supplied to detection circuits 76 and 78 and ambient detection circuit 84 in order to enable the circuits to distinguish between subsequent frames captured by the light-sensing modules. As with previously described embodiments, digital output signal 68' is supplied to taillight detection circuit 76, headlight detection circuit 78, and ambient sense logic circuit 84.

Figure 11A:
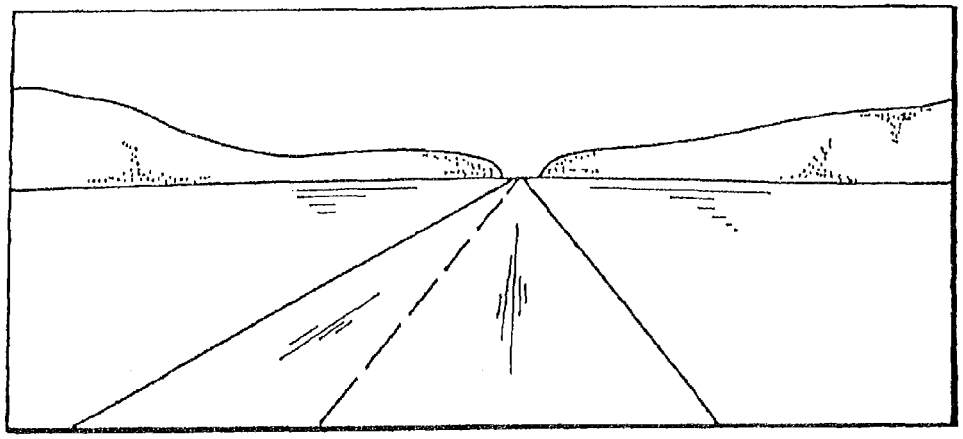
FIGS. 11a-11c are views forward of a vehicle illustrating different forms of spatial filtering.

The present invention is capable of identifying point sources of light in any particular location within the scene viewed forward of the vehicle. Additional discrimination between oncoming headlights and leading taillights may be accomplished by taking into account the relative location of the source of light within the scene. For example, as best seen by reference to FIG. 11a, particular relationships have been discovered to exist between light sources of interest and their spatial location forward of the vehicle. Oncoming headlights and leading taillights of interest can be characterized, at least in part, based upon their displacement from the central axis of the vehicle. On-axis light sources of interest can be at both close and far away separation distances. However, off-axis light sources may only be of interest if at a close separation distance from the vehicle. Assuming for illustration purposes that headlights and taillights are of the same size, headlights and taillights of interest occupy an increasing spatial area as they move off axis. Therefore, the resolution required to detect lights of interest may decrease off axis. Additionally, the fact that close-up off-axis light sources have significant spatial area would allow image-processing techniques to be employed to discriminate between close-up off-axis light sources of interest and distant off-axis light sources, which are not of interest. This may be accomplished through customized optics or other known variations in pixel resolution. Furthermore, headlights and taillights of interest are of greater intensity, because of their closeness, off axis. This allows an increase in intensity detection thresholds off axis without missing detection of such light sources. This increase in detection threshold and reduction in resolution off axis assists in avoiding false detection of light sources not of interest, such as a streetlights, building lights, and the like.

Figure 11B:
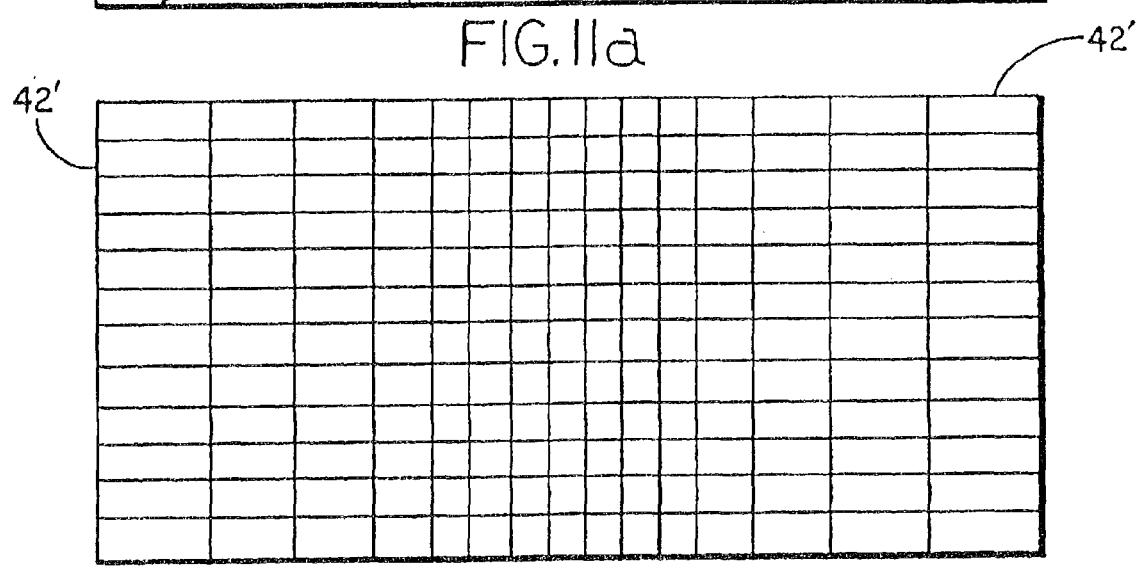
Figure 11C:
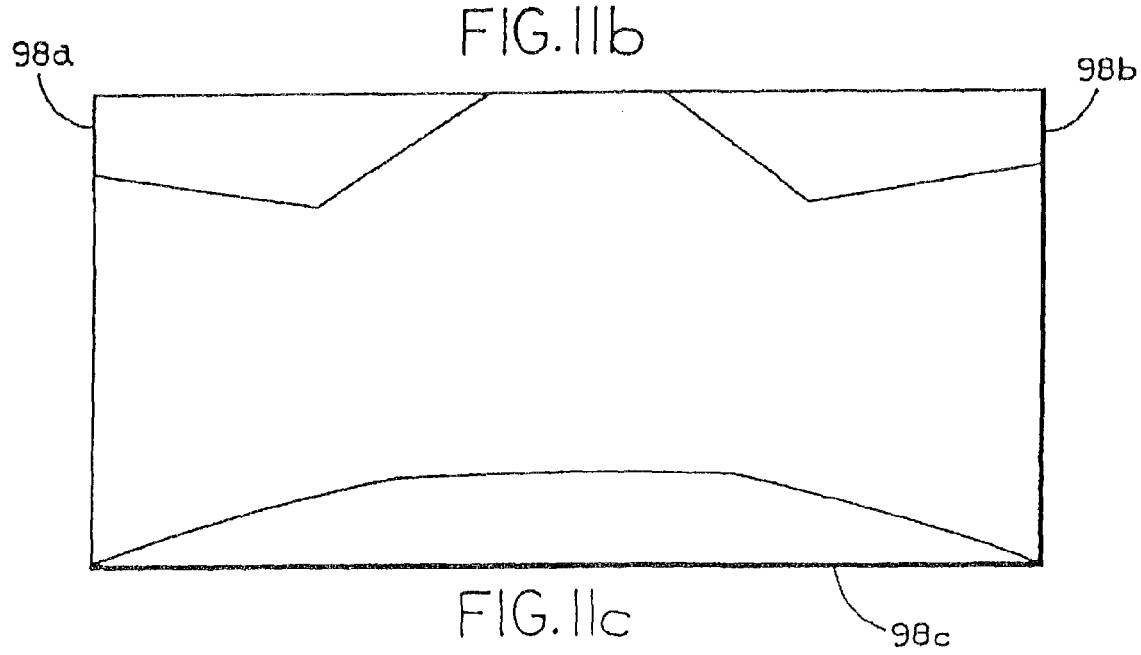

In order to take into account this spatial differentiation, the present invention comprehends detecting light sources at a lower threshold centrally of the scene and at a higher threshold at the periphery of the scene. This may be accomplished either optically, or electronically, or both. Optically, this may be accomplished by providing a non-uniform magnification to optical device 36. For example, an optical device may have optical magnification at a central portion thereof and an optical attenuation at a peripheral region thereof. Additionally, optical device 36 may have a relatively wide horizontal field of view and a relatively narrow vertical field of view. The narrow vertical field of view would tend to reduce the detection of street lights and other overhead light sources. In a preferred embodiment, optical device 36 is a lens that is made from injection-molded plastic. Electronically, such spatial differentiation may be accomplished by establishing a higher threshold level for pixel intensity detection for pixels located at the periphery of the scene than for pixels located centrally of the scene. This would cause centrally positioned light sources to be detected at a lower intensity level than sources detected at the periphery of the scene. Such spatial differentiation could also be accomplished by a non-symmetrical mapping of light to the sensor array, as illustrated in FIG. 11b, or by masking portions 98a, 98b, and 98c, at the periphery of the scene, as illustrated in FIG. 11c, so that these portions are not sensed at all. Spatial differentiation could also be accomplished by providing non-uniform pixel size.

The present invention is exceptionally sensitive to sources of light having spectral signatures of oncoming headlights and leading taillights. By recognizing the spectral signature of the light sources, many non-relevant light sources may be ignored. By examining light sources pixel-by-pixel, relatively small light sources may be detected at great distances in order to dim the headlights well before they become a nuisance to the driver of the vehicle ahead of the control vehicle. This is accomplished, according to a preferred embodiment, by utilizing an imaging sensor made up of an array of photosensing elements in a compact design which responds to light sources in a scene forward of the vehicle. Furthermore, such sensor preferably utilizes digital processing techniques which are well adapted for use with custom digital electronic circuitry, avoiding the expense and speed constraints of general purpose programmable microprocessors.

The present invention takes advantage of the spectral signatures both of light sources which must be detected in a headlight dimming control as well as the spectral signatures of light sources which must be rejected in a headlight dimming control. For example, federal regulations establish specific spectral bands that must be utilized in vehicle taillights; namely red. Furthermore, federal legislation prohibits the use of red light sources in the vicinity of a highway. Lane markers, signs, and other sources of reflected light are all specified in a manner which may be readily identified by spectral signature. Oncoming headlights, according to known technology, have a visible spectral signature which is predominantly white light. As light source technology evolves, the present invention facilitates detection of other spectral signatures of light sources in the future.

The present invention is capable of utilizing spatial filtering to even further enhance the ability to identify light sources. By spatial filtering is meant consideration of not only whether a particular pixel, or pixel group, is detecting a light source having a particular spectral signature, but also what adjacent, or closely related, pixels or pixel groups, are detecting. For example, it can be concluded that very closely adjacent red and white light sources are not of interest as oncoming headlights or taillights. An example where such pattern could be observed is a streetlight observed with a system having imperfect color correction, which can produce a white light surrounded by a red halo. By evaluation of adjacent pixel groups, a closely proximate red light source and white light source can be identified as a streetlight and not either a headlight or a taillight.

Pattern recognition may be used to further assist in the detection of headlights, taillights, and other objects of interest. Pattern recognition identifies objects of interest based upon their shape, reflectivity, luminance, and spectral characteristics. For example, the fact that headlights and taillights usually occur in pairs could be used to assist in qualifying or disqualifying objects as headlights and taillights. By looking for a triad pattern, including the center high-mounted stoplight required on the rear of vehicles, stoplight recognition can be enhanced. Furthermore, object recognition can be enhanced by comparing identified objects over successive frames. This temporal processing can yield information on object motion and can be used to assist in qualifying or disqualifying objects of interest.

Figure 12A:
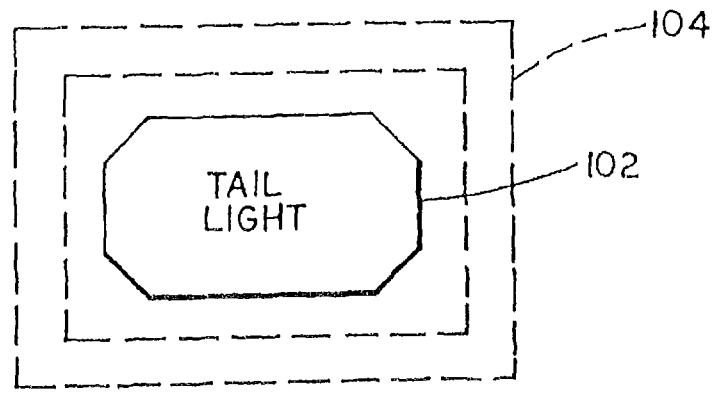
FIGS. 12a and 12b are illustrations of use of the invention to detect particular atmospheric conditions.
Figure 12B:
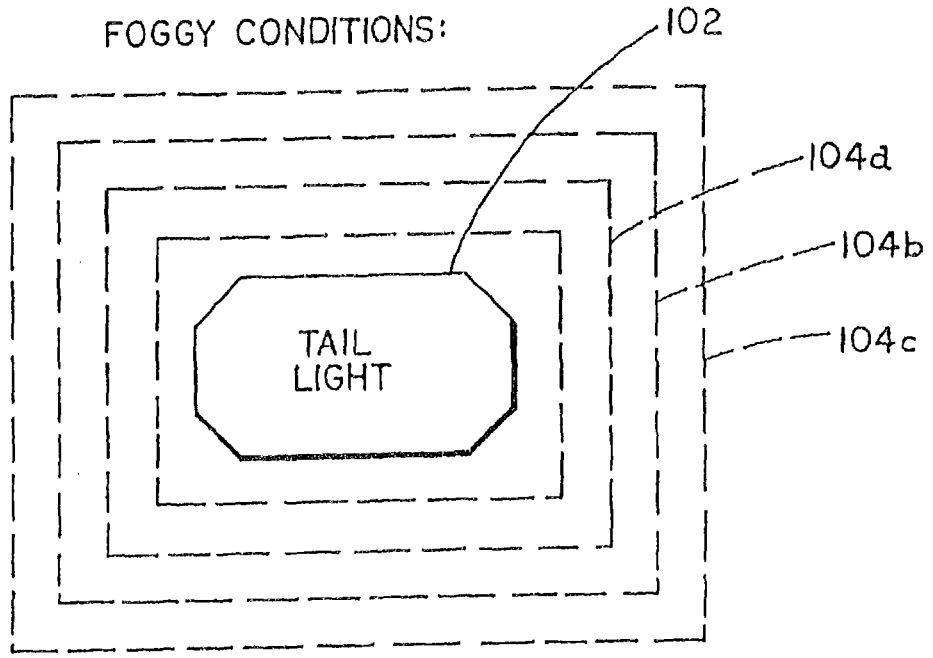

Spatial filtering can also be useful in identifying atmospheric conditions by detecting effects on light sources caused by particular types of atmospheric conditions. One such atmospheric condition is fog. A bright light source 102 is surrounded by a transition region 104 between the intensity of the light source and the black background (FIG. 12a). Fog, or fine rain, tends to produce a dispersion effect around light sources which causes a series of transition regions 104a, 104b . . . 104n which extend further from the light source (FIG. 12b). By placing appropriate limits on the size of the transition region, fog or light rain, or a mixture of both, or other related atmospheric conditions, can be detected. In response to such atmospheric conditions, vehicle headlight dimming control 12 may activate fog lights, inhibit switching to high beams, or perform other control functions. Furthermore, fog, or fine rain, can be detected, or confirmed, by analyzing the effects of headlights 18 in the forward scene as reflected off of moisture particles.

Spatial filtering can also be used to detect rain on windshield 32. This may be accomplished by performing statistical analyses between a pixel, or pixel group, and adjacent pixels or pixel groups. A view forward of a vehicle through a dry windshield would be sensed by an imaging sensor module as continuously varying differences between adjacent pixels, or pixel groups, assumed to be under constant illumination from light sources. When, however, a droplet of water or a snowflake is on windshield 32, an effect is created which causes a lack of continuous variation of differences between adjacent pixels, or pixel groups. This has the tendency to reduce the first derivative of the pixel, a condition which can be determined by processing.

Processing can be used to determine the first derivative of an image captured by image-sensing module 14 by determining a measure of the entropy, or disarray, of a pixel, or pixel group, with respect to its neighbors. For example, an approximation of the first derivative for a pixel is:

$$\frac{d(P_i)}{dxy} = \frac{\sqrt{\sum_{j=1}^{n} (Pi - Pj)^2}}{N}$$

where N=8 and where Pi is a given pixel and Pj is one of 8 neighboring pixels.

It should be apparent to those skilled in the art that the invention is capable of performing control functions other than controlling the dimming of the vehicle's headlights. For example, spectral signature identifications may be utilized to detect the state of a traffic light to either warn the driver that a light has changed from green to yellow to red or to automatically decelerate and stop the vehicle. Also, by sensing that the intensity of a leading taillight has abruptly increased, a condition where the leading vehicle is braking may be identified and suitable action taken.

The invention may be utilized to identify particular traffic signs by their spectral signature as well as their geometric organization. For example, red octagons may be identified as stop signs, yellow triangles as caution signs, and the like. These capabilities are a result of the present invention providing a significant reduction in the amount of data to be processed because the image forward of the vehicle is captured in a manner which preselects data. Preselection of data is accomplished by configuring the sensor array, including the optics thereof, to consider the spatial, as well as the spectral, characteristics of light sources.

The present invention may be used to determine the environment in which the vehicle is operated. For example, a high level of "non-qualified" light sources; namely, light sources that are not headlights or taillights, as well as "qualified" light sources can be used to determine a measurement of the activity level around the vehicle; namely, that the vehicle is in an urban environment which may be a useful input for particular control algorithms. This may be accomplished as follows. An activity counter is established which represents a total number of pixels, or pixel groups, whose red, green, or blue components exceed a threshold. The threshold is set to a relatively low value, namely just above the noise floor. This counter, which registers any real detected source, is reset and retabulated every frame, preferably during the exposure period for detecting taillights. If the activity counter exceeds a particular value, then a high activity environment is detected. One use of this information would be to inhibit the control from switching the vehicle's headlights from a low-beam state to a high-beam state unless a low activity condition exists for awhile. The activity counter may be used by the control in combination with a low-beam duration counter which records the number of frames that the system has been in a low-beam state. It is reset upon system power-up and at every transition from the high-to-low beam states. The control may be inhibited from switching the vehicle's headlights to the high-beam state unless either the low-beam duration counter exceeds a value or the activity counter indicates a sustained low activity condition.

The present invention can be used to detect lane markers in order to either assist in steering the vehicle or provide a warning to the driver that a lane change is occurring. The capability of the invention to detect rain on the vehicle's windshield could be used to control the vehicle's wipers both between OFF and ON conditions and to establish a frequency of intermittent operation.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A driver assistance system for a vehicle, said driver assistance system comprising:

a bracket attached at a windshield of a vehicle equipped with said driver assistance system;

a housing mounted to said bracket;

an imager disposed in said housing;

said imager comprising (i) a two-dimensional CMOS photosensor array of photosensor elements and (ii) a lens;

wherein, with said housing mounted to said bracket attached at the vehicle windshield, said imager views to the exterior of the equipped vehicle through the windshield of the equipped vehicle at a region of the windshield that is swept by a windshield wiper of the equipped vehicle;

wherein said photosensor array is operable to capture image data;

a control comprising an image processor;

wherein said image processor is disposed in said housing;

wherein said image processor comprises a digital signal processor;

wherein said driver assistance system identifies objects viewed by said imager via processing by said image processor of captured image data;

wherein a spectral filter is disposed between said photosensor array and said lens; and wherein said spectral filter provides red spectral filtering at some of said photosensor elements and not at others of said photosensor elements.

2. The driver assistance system of claim 1, wherein said control at least one of (a) controls a headlight of the equipped vehicle at least in part as a function of a speed of the equipped vehicle, (b) controls a headlight of the equipped vehicle at least in part in response to said image processing, (c) controls a speed of the equipped vehicle at least in part in response to said image processing, (d) generates an alert to the driver of the equipped vehicle responsive at least in part to image processing by said image processor, (e) responsive at least in part to image processing by said image processor, warns the driver of the equipped vehicle, (f) responsive at least in part to image processing by said image processor, decelerates the equipped vehicle, and (g) responsive at least in part to image processing by said image processor, stops the equipped vehicle.

3. The driver assistance system of claim 1, wherein said control controls a headlight of the equipped vehicle responsive, at least in part, to identification of at least one of (i) a headlight of an approaching vehicle in the forward field of view of said imager and (ii) a taillight of a leading vehicle in the forward field of view of said imager, and wherein said control is operable to at least one of (a) adjust an aim of the headlight of the equipped vehicle, (b) adjust an intensity of the headlight of the equipped vehicle, (c) adjust a pattern of the headlight of the equipped vehicle, (d) switch between a daytime running light condition and another lighting condition, (e) adjust a beam condition of the headlight of the equipped vehicle and (f) adjust a beam of the headlight of the equipped vehicle.

4. The driver assistance system of claim 1, wherein said photosensor array is operable to capture frames of image data at first and second exposure periods and wherein said first exposure period is shorter than said second exposure period.

5. The driver assistance system of claim 4, wherein said driver assistance system is operable to identify headlights of approaching vehicles responsive to processing of image data captured at said first exposure period and taillights of leading vehicles responsive to processing of image data captured at said second exposure period.

6. The driver assistance system of claim 1, wherein at least one of (a) identification of objects is based at least in part on a spectral characteristic of objects present in the forward field of view of said imager, and (b) identification of objects is based at least in part on said control determining that spatially adjacent regions of the forward field of view of said imager include objects having a particular spectral characteristic.

7. The driver assistance system of claim 1, wherein said control determines if a particular object present forward of the equipped vehicle has a particular spectral characteristic by comparing levels of light sensed by photosensor elements which respond to light in a red spectral region with levels of light sensed by photosensor elements which respond to light in a different spectral region.

8. The driver assistance system of claim 7, wherein said particular object present forward of the equipped vehicle comprises one of (i) an approaching headlight, (ii) a leading taillight, (iii) a lane marker, (iv) a traffic sign, (v) a traffic light, (vi) a stop sign and (vii) a caution sign.

9. The driver assistance system of claim 1, wherein at least one of (a) non-red filtered others of said photosensor elements are neighbors of said red filtered photosensor elements and (b) non-red filtered others of said photosensor elements are immediately adjacent to said red filtered photosensor elements.

10. The driver assistance system of claim 1, wherein a green spectral filter is disposed in front of non-red filtered others of said photosensor elements.

11. The driver assistance system of claim 1, wherein a blue spectral filter is disposed in front of non-red filtered others of said photosensor elements.

12. The driver assistance system of claim 1, wherein at least one of (a) identification of objects is based at least in part on the spatial location of objects present in the forward field of view of said imager, (b) said driver assistance system determines an activity level around the equipped vehicle, (c) said driver assistance system determines an environment in which the equipped vehicle is being driven, and (d) said driver assistance system determines an environment in which the equipped vehicle is being driven and said driver assistance system controls a headlight of the equipped vehicle at least in part responsive to said determination of the environment in which the equipped vehicle is being driven.

13. The driver assistance system of claim 1, wherein said driver assistance system is operable to identify lane markers on a road being traveled by the equipped vehicle in order to at least one of (a) assist the driver in steering the equipped vehicle and (b) provide a warning to the driver of the equipped vehicle.

14. The driver assistance system of claim 13, wherein identification of lane markers comprises identification of lane markers by a spectral characteristic.

15. The driver assistance system of claim 1, wherein said driver assistance system is operable to determine atmospheric conditions at the equipped vehicle, and wherein, responsive at least in part to determination of atmospheric conditions, said control is operable to at least one of (i) activate a fog light of the equipped vehicle, (ii) adjust a light beam emitted by a headlight of the equipped vehicle and (iii) inhibit operation of a headlight of the equipped vehicle in a high beam state.

16. The driver assistance system of claim 1, wherein said photosensor array is operable to capture frames of image data and wherein identification of objects is enhanced by comparing image data of objects over successive frames of said captured image data.

17. The driver assistance system of claim 1, wherein identification of objects is based at least in part on at least one of (i) shape, (ii) luminance, (iii) geometry, (iv) spatial location, (v) motion and (vi) spectral characteristic.

18. The driver assistance system of claim 1, wherein said driver assistance system is operable to detect a state of a traffic light and wherein, responsive at least in part to image processing by said image processor detecting a color state of the traffic light, said control at least one of (i) warns the driver of the equipped vehicle, (ii) decelerates the equipped vehicle and (ii) stops the equipped vehicle.

19. The driver assistance system of claim 18, wherein, at least in part responsive to image processing by said image processor, said driver assistance system detects the color state of the traffic light changing from at least one of (i) green to yellow and (ii) yellow to red.

20. The driver assistance system of claim 1, wherein image processing by said image processor of captured image data comprises determination that an object present forward of the equipped vehicle is a stop sign based upon at least one of (i) the object comprising an octagon shape, (ii) the object comprising a red color and (iii) the spatial location of the object in the forward field of view of said imager.

21. The driver assistance system of claim 1, wherein image processing by said image processor of captured image data comprises determination that an object present forward of the equipped vehicle is a caution sign based upon at least one of (i) the object comprising a triangular shape, (ii) the object comprising a yellow color and (iii) the spatial location of the object in the forward field of view of said imager.

22. The driver assistance system of claim 1, wherein said driver assistance system includes an exposure control which determines an accumulation period of time said photosensor array senses light when capturing a frame of image data and wherein said exposure control defines a plurality of accumulation periods.

23. The driver assistance system of claim 22, wherein at least one of (a) said plurality of accumulation periods comprises a first accumulation period for a first frame of captured image data and a second accumulation period for a second frame of captured image data and wherein said first accumulation period is a longer time period than said second accumulation period, (b) said plurality of accumulation periods comprises a first accumulation period for a first frame of captured image data and a second accumulation period for a second frame of captured image data and wherein said first accumulation period is a longer time period than said second accumulation period and wherein said first frame is used when detecting leading vehicle taillights and said second frame is used when detecting approaching vehicle headlights, (c) said exposure control is adaptive and wherein at least one of (i) an accumulation period for a frame of captured image data is set on a priority basis, and (ii) an accumulation period for a frame of captured image data is determined in response to what said driver assistance system is sensing to be present in the forward field of view of said imager, and (d) said exposure control maintains an accumulation period until an object of interest is at least tentatively detected and wherein said exposure control changes to a different accumulation period when an object of interest is at least tentatively detected.

24. The driver assistance system of claim 1, wherein said spectral filter comprises a red/green/blue spectral filter.

25. The driver assistance system of claim 1, comprising an analog-to-digital converter and wherein analog pixel values output by said photosensor array are converted to digital values.

26. The driver assistance system of claim 1, wherein said digital signal processor comprises a microprocessor.

27. The driver assistance system of claim 1, wherein said imager is fixedly mounted in said housing.

28. The driver assistance system of claim 1, wherein said digital signal processor comprises at least one discrete digital circuit module.

29. The driver assistance system of claim 1, wherein said photosensor array is arranged in a matrix of columns of photosensor elements and rows of photosensor elements, and wherein a photosensor element of said photosensor array can be individually accessed via at least one register.

30. The driver assistance system of claim 29, wherein at least one of (i) the number of columns exceeds 512, (ii) the number of rows exceeds 512 and (iii) said photosensor array comprises at least 262,144 photosensor elements.

31. A driver assistance system for a vehicle, said driver assistance system comprising:
a two-dimensional CMOS photosensor array of photosensor elements;
wherein said photosensor array views to the exterior of a vehicle equipped with said driver assistance system, and wherein said photosensor array views through the windshield of the equipped vehicle at a region of the windshield that is swept by a windshield wiper of the equipped vehicle;
wherein said photosensor array is operable to capture image data;
a control comprising an image processor;
wherein said driver assistance system identifies objects viewed by said photosensor array via processing by said image processor of captured image data;
wherein identification of objects is based at least in part on at least one of (i) shape, (ii) luminance, (iii) geometry, (iv) spatial location, (v) motion and (vi) spectral characteristic;
wherein said driver assistance system identifies (a) headlights of approaching vehicles and (b) taillights of leading vehicles; and
wherein said driver assistance system identifies lane markers on a road being traveled by the equipped vehicle.

32. The driver assistance system of claim 31, wherein said driver assistance system identifies lane markers on the road being traveled by the equipped vehicle in order to at least one of (a) assist the driver in steering the equipped vehicle and (b) provide a warning to the driver of the equipped vehicle.

33. The driver assistance system of claim 31, wherein a red spectral filter is disposed in front of some of said photosensor elements and wherein a red spectral filter is not disposed in front of others of said photosensor elements, and wherein at least one of (a) non-red filtered others of said photosensor elements are neighbors of said red filtered photosensor elements and (b) non-red filtered others of said photosensor elements are immediately adjacent to said red filtered photosensor elements.

34. The driver assistance system of claim 31, wherein said photosensor array comprises an array of rows and columns and wherein at least one of (i) the number of columns exceeds 512, (ii) the number of rows exceeds 512 and (iii) said photosensor array comprises at least 262,144 photosensor elements.

35. The driver assistance system of claim 31, wherein said photosensor array is operable to capture frames of image data and wherein identification of objects is enhanced by comparing image data of objects over successive frames of said captured image data.

36. The driver assistance system of claim 31, wherein said photosensor array is operable to capture frames of image data at first and second exposure periods and wherein said first exposure period is shorter than said second exposure period.

37. The driver assistance system of claim 36, wherein said driver assistance system is operable to identify headlights of approaching vehicles responsive to processing of image data captured at said first exposure period and taillights of leading vehicles responsive to processing of image data captured at said second exposure period.

38. The driver assistance system of claim 31, wherein (a) identification of headlights is based at least in part on a spectral characteristic of headlights, and wherein identification of headlights is based at least in part on said control determining that spatially adjacent regions of the forward field of view of said photosensor array include a headlight having a particular spectral characteristic, and (b) identification of taillights is based at least in part on a spectral characteristic of taillights, and wherein identification of taillights is based at least in part on said control determining that spatially adjacent regions of the forward field of view of said photosensor array include a taillight having a particular spectral characteristic.

39. The driver assistance system of claim 31, wherein said control determines if a particular object present forward of the equipped vehicle has a particular spectral characteristic by comparing levels of light sensed by photosensor elements which respond to light in a particular spectral region with levels of light sensed by photosensor elements which respond to light in a different spectral region.

40. The driver assistance system of claim 39, wherein said particular object present forward of the equipped vehicle comprises one of (i) a traffic sign, (ii) a traffic light, (iii) a stop sign and (iv) a caution sign.

41. The driver assistance system of claim 31, wherein at least one of (a) identification of objects is based at least in part on the spatial location of objects present in the forward field of view of said photosensor array, (b) said driver assistance system determines an activity level around the equipped vehicle, (c) said driver assistance system determines an environment in which the equipped vehicle is being driven, and (d) said driver assistance system determines an environment in which the equipped vehicle is being driven and said driver assistance system controls a headlight of the equipped vehicle at least in part responsive to said determination of the environment in which the equipped vehicle is being driven.

42. The driver assistance system of claim 31, wherein said driver assistance system is operable to determine atmospheric conditions at the equipped vehicle, and wherein, responsive at least in part to determination of atmospheric conditions, said control is operable to at least one of (i) activate a fog light of the equipped vehicle, (ii) adjust a light beam emitted by a headlight of the equipped vehicle and (iii) inhibit operation of a headlight of the equipped vehicle in a high beam state.

43. The driver assistance system of claim 31, wherein said control controls a headlight of the equipped vehicle responsive, at least in part, to identification of at least one of (i) a headlight of an approaching vehicle in the forward field of view of said photosensor array and (ii) a taillight of a leading vehicle in the forward field of view of said photosensor array, and wherein said control is operable to at least one of (a) adjust an aim of the headlight of the equipped vehicle, (b) adjust an intensity of the headlight of the equipped vehicle, (c) adjust a pattern of the headlight of the equipped vehicle, (d) switch between a daytime running light condition and another lighting condition, (e) adjust a beam condition of the headlight of the equipped vehicle and (f) adjust a beam of the headlight of the equipped vehicle.

44. The driver assistance system of claim 31, wherein said control at least one of (a) controls a headlight of the equipped vehicle at least in part as a function of a speed of the equipped vehicle, (b) controls a headlight of the equipped vehicle at least in part in response to said image processing, (c) controls a speed of the equipped vehicle at least in part in response to said image processing, (d) generates an alert to the driver of the equipped vehicle responsive at least in part to image processing by said image processor, (e) responsive at least in part to image processing by said image processor, warns the driver of the equipped vehicle, (f) responsive at least in part to image processing by said image processor, decelerates the equipped vehicle, and (g) responsive at least in part to image processing by said image processor, stops the equipped vehicle.

45. The driver assistance system of claim 31, wherein said driver assistance system is operable to detect a state of a traffic light and wherein, responsive at least in part to image processing by said image processor detecting a color state of the traffic light, said control at least one of (i) warns the driver of the equipped vehicle, (ii) decelerates the equipped vehicle and (ii) stops the equipped vehicle.

46. The driver assistance system of claim 45, wherein, at least in part responsive to image processing by said image processor, said driver assistance system detects the color state of the traffic light changing from at least one of (i) green to yellow and (ii) yellow to red.

47. The driver assistance system of claim 31, wherein image processing by said image processor of captured image data comprises determination that an object present forward of the equipped vehicle is a stop sign based upon at least one of (i) the object comprising an octagon shape, (ii) the object comprising a red color and (iii) the spatial location of the object in the forward field of view of said photosensor array.

48. The driver assistance system of claim 31, wherein image processing by said image processor of captured image data comprises determination that an object present forward of the equipped vehicle is a caution sign based upon at least one of (i) the object comprising a triangular shape, (ii) the object comprising a yellow color and (iii) the spatial location of the object in the forward field of view of said photosensor array.

49. The driver assistance system of claim 31, wherein said driver assistance system includes an exposure control which determines an accumulation period of time said photosensor array senses light when capturing a frame of image data and wherein said exposure control defines a plurality of accumulation periods.

50. The driver assistance system of claim 49, wherein at least one of (a) said plurality of accumulation periods comprises a first accumulation period for a first frame of captured image data and a second accumulation period for a second frame of captured image data and wherein said first accumulation period is a longer time period than said second accumulation period, (b) said plurality of accumulation periods comprises a first accumulation period for a first frame of captured image data and a second accumulation period for a second frame of captured image data and wherein said first accumulation period is a longer time period than said second accumulation period and wherein said first frame is used when detecting leading vehicle taillights and said second frame is used when detecting approaching vehicle headlights, (c) said exposure control is adaptive and wherein at least one of (i) an accumulation period for a frame of captured image data is set on a priority basis, and (ii) an accumulation period for a frame of captured image data is determined in response to what said driver assistance system is sensing to be present in the forward field of view of said photosensor array, and (d) said exposure control maintains an accumulation period until an object of interest is at least tentatively detected and wherein said exposure control changes to a different accumulation period when an object of interest is at least tentatively detected.

51. The driver assistance system of claim 31, wherein said photosensor array comprises at least 262,144 photosensor elements.

52. The driver assistance system of claim 31, wherein said photosensor array comprises an array of rows and columns and wherein at least one of (i) the number of columns exceeds 512, (ii) the number of rows exceeds 512 and (iii) said photosensor array comprises at least 262,144 photosensor elements.

53. The driver assistance system of claim 31, wherein said photosensor array, a lens and a spectral filter are disposed in a housing.

54. The driver assistance system of claim 53, wherein said housing mounts via a bracket at the vehicle windshield.

55. The driver assistance system of claim 54, wherein said photosensor array is operable to capture frames of image data and wherein identification of objects is enhanced by comparing image data of objects over successive frames of said captured image data.

56. The driver assistance system of claim 53, wherein said lens comprises a plastic lens.

57. The driver assistance system of claim 53, wherein at least one of (a) said spectral filter attenuates light having a wavelength greater than about 830 nanometers and wherein light emitted by sources external of the equipped vehicle and/or reflected by objects external of the equipped vehicle is filtered by said spectral filter to be incident on said photosensor array, (b) said spectral filter comprises a red filter that passes visible light of wavelength generally in the red portion of the visible spectrum and that attenuates light having wavelengths generally outside the red portion of the visible spectrum, and (c) said spectral filter comprises a red complement filter that substantially passes wavelengths generally outside the red portion of the visible spectrum and that attenuates wavelengths generally outside the red portion of the visible spectrum.

58. The driver assistance system of claim 53, wherein said image processor comprises a digital signal processor.

59. The driver assistance system of claim 58, wherein said digital signal processor is disposed in said housing.

60. The driver assistance system of claim 31, wherein said driver assistance system discriminates at least one of (i) headlights of approaching vehicles from streetlights and (ii) taillights of leading vehicles from streetlights.

61. The driver assistance system of claim 31, wherein said driver assistance system discriminates at least one of (i) headlights of approaching vehicles from reflections off signs of light emitted by the equipped vehicle's headlights and (ii) taillights of leading vehicles from reflections off signs of light emitted by the equipped vehicle's headlights.

62. The driver assistance system of claim 31, wherein said photosensor array is arranged in a matrix of columns of photosensor elements and rows of photosensor elements, and wherein a photosensor element of said photosensor array can be individually accessed via at least one register, and wherein at least one of (i) the number of columns exceeds 512, (ii) the number of rows exceeds 512 and (iii) said photosensor array comprises at least 262,144 photosensor elements.

63. A driver assistance system for a vehicle, said driver assistance system comprising:
a two-dimensional CMOS photosensor array of photosensor elements;
wherein said photosensor array views to the exterior of a vehicle equipped with said driver assistance system, and wherein said photosensor array views through the windshield of the equipped vehicle at a region of the windshield that is swept by a windshield wiper of the equipped vehicle;
wherein said photosensor array is operable to capture image data;
a control comprising an image processor;
wherein said driver assistance system identifies objects viewed by said photosensor array via processing by said image processor of captured image data;
wherein a red spectral filter is disposed in front of some of said photosensor elements and wherein a red spectral filter is not disposed in front of others of said photosensor elements; and
wherein said photosensor array comprises at least 262,144 photosensor elements.

64. The driver assistance system of claim 63, wherein said red spectral filter is disposed between a lens and said photosensor array.

65. The driver assistance system of claim 63, wherein said photosensor array is accommodated in a body at the in-cabin surface of the windshield of the equipped vehicle.

66. The driver assistance system of claim 65, wherein said body accommodates said image processor.

67. The driver assistance system of claim 63, wherein a green spectral filter is disposed in front of non-red filtered others of said photosensor elements.

68. The driver assistance system of claim 63, wherein a blue spectral filter is disposed in front of non-red filtered others of said photosensor elements.

69. The driver assistance system of claim 63, wherein at least one of (a) identification of objects is based at least in part on the spatial location of objects present in the forward field of view of said photosensor array, (b) said driver assistance system determines an activity level around the equipped vehicle, (c) said driver assistance system determines an environment in which the equipped vehicle is being driven, and (d) said driver assistance system determines an environment in which the equipped vehicle is being driven and said driver assistance system controls a headlight of the equipped vehicle at least in part responsive to said determination of the environment in which the equipped vehicle is being driven.

70. The driver assistance system of claim 63, wherein said driver assistance system is operable to identify lane markers on a road being traveled by the equipped vehicle in order to at least one of (a) assist the driver in steering the equipped vehicle and (b) provide a warning to the driver of the equipped vehicle.

71. The driver assistance system of claim 70, wherein, and identification of lane markers comprises identification of lane markers by a spectral characteristic.

72. The driver assistance system of claim 63, wherein said driver assistance system is operable to determine atmospheric conditions at the equipped vehicle, and wherein, responsive at least in part to determination of atmospheric conditions, said control is operable to at least one of (i) activate a fog light of the equipped vehicle, (ii) adjust a light beam emitted by a headlight of the equipped vehicle and (iii) inhibit operation of a headlight of the equipped vehicle in a high beam state.

73. The driver assistance system of claim 63, wherein said photosensor array is operable to capture frames of image data and wherein identification of objects is enhanced by comparing image data of objects over successive frames of said captured image data.

74. The driver assistance system of claim 63, wherein identification of objects is based at least in part on at least one of (i) shape, (ii) luminance, (iii) geometry, (iv) spatial location, (v) motion and (vi) spectral characteristic.

75. The driver assistance system of claim 63, wherein said driver assistance system is operable to detect a state of a traffic light and wherein, responsive at least in part to image processing by said image processor detecting a color state of the traffic light, said control at least one of (i) warns the driver of the equipped vehicle, (ii) decelerates the equipped vehicle and (ii) stops the equipped vehicle.

76. The driver assistance system of claim 75, wherein, at least in part responsive to image processing by said image processor, said driver assistance system detects the color state of the traffic light changing from at least one of (i) green to yellow and (ii) yellow to red.

77. The driver assistance system of claim 63, wherein image processing by said image processor of captured image data comprises determination that an object present forward of the equipped vehicle is a stop sign based upon at least one of (i) the object comprising an octagon shape, (ii) the object comprising a red color and (iii) the spatial location of the object in the forward field of view of said photosensor array.

78. The driver assistance system of claim 63, wherein image processing by said image processor of captured image data comprises determination that an object present forward of the equipped vehicle is a caution sign based upon at least one of (i) the object comprising a triangular shape, (ii) the object comprising a yellow color and (iii) the spatial location of the object in the forward field of view of said photosensor array.

79. The driver assistance system of claim 63, wherein said driver assistance system includes an exposure control which determines an accumulation period of time said photosensor array senses light when capturing a frame of image data and wherein said exposure control defines a plurality of accumulation periods.

80. The driver assistance system of claim 79, wherein at least one of (a) said plurality of accumulation periods comprises a first accumulation period for a first frame of captured image data and a second accumulation period for a second frame of captured image data and wherein said first accumulation period is a longer time period than said second accumulation period, (b) said plurality of accumulation periods comprises a first accumulation period for a first frame of captured image data and a second accumulation period for a second frame of captured image data and wherein said first accumulation period is a longer time period than said second accumulation period and wherein said first frame is used when detecting leading vehicle taillights and said second frame is used when detecting approaching vehicle headlights, (c) said exposure control is adaptive and wherein at least one of (i) an accumulation period for a frame of captured image data is set on a priority basis, and (ii) an accumulation period for a frame of captured image data is determined in response to what said driver assistance system is sensing to be present in the forward field of view of said photosensor array, and (d) said exposure control maintains an accumulation period until an object of interest is at least tentatively detected and wherein said exposure control changes to a different accumulation period when an object of interest is at least tentatively detected.

81. The driver assistance system of claim 63, wherein said photosensor array is arranged in a matrix of columns of photosensor elements and rows of photosensor elements, and wherein a photosensor element of said photosensor array can be individually accessed via at least one register, and wherein at least one of (i) the number of columns exceeds 512 and (ii) the number of rows exceeds 512.

82. A driver assistance system for a vehicle, said driver assistance system comprising:
a two-dimensional CMOS photosensor array of photosensor elements;
wherein said photosensor array views to the exterior of a vehicle equipped with said driver assistance system, and wherein said photosensor array views through the windshield of the equipped vehicle at a region of the windshield that is swept by a windshield wiper of the equipped vehicle;
wherein said photosensor array is operable to capture image data;
a control comprising an image processor;
wherein said driver assistance system identifies objects viewed by said photosensor array via processing by said image processor of captured image data;
wherein said photosensor array comprises at least 262,144 photosensor elements;
wherein a spectral filter is disposed between said photosensor array and a lens;
wherein said photosensor array, said lens and said spectral filter are disposed in a housing that mounts via a bracket at the vehicle windshield; and
wherein objects identified present forward of the equipped vehicle comprise at least one of (i) approaching headlights, (ii) leading taillights, (iii) lane markers, (iv) traffic signs, (v) traffic lights, (vi) stop signs and (vii) caution signs.

83. The driver assistance system of claim 82, wherein said driver assistance system is operable to identify lane markers on a road being traveled by the equipped vehicle in order to at least one of (a) assist the driver in steering the equipped vehicle and (b) provide a warning to the driver of the equipped vehicle.

84. The driver assistance system of claim 83, wherein identification of lane markers comprises identification of lane markers by a spectral characteristic.

85. The driver assistance system of claim 82, wherein a red spectral filter is disposed in front of some of said photosensor elements and wherein a red spectral filter is not disposed in front of others of said photosensor elements.

86. The driver assistance system of claim 85, wherein said control controls a headlight of the equipped vehicle responsive, at least in part, to identification of at least one of (i) a headlight of an approaching vehicle in the forward field of view of said photosensor array and (ii) a taillight of a leading vehicle in the forward field of view of said photosensor array, and wherein said control is operable to at least one of (a) adjust an aim of the headlight of the equipped vehicle, (b) adjust an intensity of the headlight of the equipped vehicle, (c) adjust a pattern of the headlight of the equipped vehicle, (d) switch between a daytime running light condition and another lighting condition, (e) adjust a beam condition of the headlight of the equipped vehicle and (f) adjust a beam of the headlight of the equipped vehicle.

87. The driver assistance system of claim 86, wherein said driver assistance system is operable to determine atmospheric conditions at the equipped vehicle, and wherein, responsive at least in part to determination of atmospheric conditions, said control is operable to at least one of (i) activate a fog light of the equipped vehicle, (ii) adjust a light beam emitted by a headlight of the equipped vehicle and (iii) inhibit operation of a headlight of the equipped vehicle in a high beam state.

88. The driver assistance system of claim 82, wherein said photosensor array is operable to capture frames of image data at first and second exposure periods and wherein said first exposure period is shorter than said second exposure period.

89. The driver assistance system of claim 82, wherein said photosensor array is arranged in a matrix of columns of photosensor elements and rows of photosensor elements, and wherein a photosensor element of said photosensor array can be individually accessed via at least one register, and wherein at least one of (i) the number of columns exceeds 512 and (ii) the number of rows exceeds 512.

90. The driver assistance system of claim 89, comprising an analog-to-digital converter and wherein analog pixel values output by said photosensor array are converted to digital values, and wherein said image processor comprises a microprocessor.

91. The driver assistance system of claim 82, wherein at least one of (a) said spectral filter attenuates light having a wavelength greater than about 830 nanometers and wherein light emitted by sources external of the equipped vehicle and/or reflected by objects external of the equipped vehicle is filtered by said spectral filter to be incident on said photosensor array, (b) said spectral filter comprises a red filter that passes visible light of wavelength generally in the red portion of the visible spectrum and that attenuates light having wavelengths generally outside the red portion of the visible spectrum, and (c) said spectral filter comprises a red complement filter that substantially passes wavelengths generally outside the red portion of the visible spectrum and that attenuates wavelengths generally outside the red portion of the visible spectrum.

92. The driver assistance system of claim 82, wherein said control at least one of (a) controls a headlight of the equipped vehicle at least in part as a function of a speed of the equipped vehicle, (b) controls a headlight of the equipped vehicle at least in part in response to said image processing, (c) controls a speed of the equipped vehicle at least in part in response to said image processing, (d) generates an alert to the driver of the equipped vehicle responsive at least in part to image processing by said image processor, (e) responsive at least in part to image processing by said image processor, warns the driver of the equipped vehicle, (f) responsive at least in part to image processing by said image processor, decelerates the equipped vehicle, and (g) responsive at least in part to image processing by said image processor, stops the equipped vehicle.

93. The driver assistance system of claim 82, wherein said driver assistance system is operable to detect a state of a traffic light and wherein, responsive at least in part to image processing by said image processor detecting a color state of the traffic light, said control at least one of (i) warns the driver of the equipped vehicle, (ii) decelerates the equipped vehicle and (iii) stops the equipped vehicle.

94. The driver assistance system of claim 82, wherein at least one of (a) image processing by said image processor of captured image data comprises determination that an object present forward of the equipped vehicle is a stop sign based upon at least one of (i) the object comprising an octagon shape, (ii) the object comprising a red color and (iii) the spatial location of the object in the forward field of view of said photosensor array and (b) image processing by said image processor of captured image data comprises determination that an object present forward of the equipped vehicle is a caution sign based upon at least one of (i) the object comprising a triangular shape, (ii) the object comprising a yellow color and (iii) the spatial location of the object in the forward field of view of said photosensor array.

95. A driver assistance system for a vehicle, said driver assistance system comprising:

a two-dimensional CMOS photosensor array of photosensor elements;

wherein said photosensor array views to the exterior of a vehicle equipped with said driver assistance system, and wherein said photosensor array views through the windshield of the equipped vehicle at a region of the windshield that is swept by a windshield wiper of the equipped vehicle;

wherein said photosensor array is operable to capture image data;

a control comprising an image processor;

wherein said driver assistance system identifies objects viewed by said photosensor array via processing by said image processor of captured image data;

wherein said photosensor array comprises at least 262,144 photosensor elements; and wherein said photosensor array is arranged in a matrix of columns of photosensor elements and rows of photosensor elements, and wherein at least one of (i) the number of columns exceeds 512 and (ii) the number of rows exceeds 512.

96. The driver assistance system of claim 95, comprising an analog-to-digital converter and wherein analog pixel values output by said photosensor array are converted to digital values, and wherein said image processor comprises a microprocessor.

97. The driver assistance system of claim 95, wherein a spectral filter is disposed between said photosensor array and a lens and wherein said photosensor array, said lens and said spectral filter are disposed in a housing that mounts via a bracket at the vehicle windshield.

98. The driver assistance system of claim 97, wherein objects identified present forward of the equipped vehicle comprise at least one of (i) approaching headlights, (ii) leading taillights, (iii) lane markers, (iv) traffic signs, (v) traffic lights, (vi) stop signs and (vii) caution signs.

99. The driver assistance system of claim 97, wherein said bracket comprises part of an interior rearview mirror system of the equipped vehicle.

100. The driver assistance system of claim 95, wherein said driver assistance system is operable to identify lane markers on a road being traveled by the equipped vehicle in order to at least one of (a) assist the driver in steering the equipped vehicle and (b) provide a warning to the driver of the equipped vehicle.

101. The driver assistance system of claim 95, wherein identification of lane markers comprises identification of lane markers by a spectral characteristic.

102. The driver assistance system of claim 95, wherein a red spectral filter is disposed in front of some of said photosensor elements and wherein a red spectral filter is not disposed in front of others of said photosensor elements.

103. The driver assistance system of claim 102, wherein said control controls a headlight of the equipped vehicle responsive, at least in part, to identification of at least one of (i) a headlight of an approaching vehicle in the forward field of view of said photosensor array and (ii) a taillight of a leading vehicle in the forward field of view of said photosensor array, and wherein said control is operable to at least one of (a) adjust an aim of the headlight of the equipped vehicle, (b) adjust an intensity of the headlight of the equipped vehicle, (c) adjust a pattern of the headlight of the equipped vehicle, (d) switch between a daytime running light condition and another lighting condition, (e) adjust a beam condition of the headlight of the equipped vehicle and (f) adjust a beam of the headlight of the equipped vehicle.

104. The driver assistance system of claim 103, wherein said driver assistance system is operable to identify lane markers on a road being traveled by the equipped vehicle.

105. The driver assistance system of claim 103, wherein said spectral filter attenuates light having a wavelength greater than about 830 nanometers and wherein light emitted by sources external of the equipped vehicle and/or reflected by objects external of the equipped vehicle is filtered by said spectral filter to be incident on said photosensor array.

106. The driver assistance system of claim 95, and wherein a photosensor element of said photosensor array can be individually accessed by a register.

107. The driver assistance system of claim 106, wherein said photosensor element of said photosensor array can be individually accessed via a horizontal shift register and a vertical shift register.

\* \* \* \* \*